US012666419B2

(12) United States Patent
Zhang et al.

(10) Patent No.: US 12,666,419 B2
(45) Date of Patent: Jun. 23, 2026

(54) ENHANCED SINGLE-DCI MULTI-PANEL UPLINK TRANSMISSIONS

(71) Applicant: Apple Inc., Cupertino, CA (US)

(72) Inventors: Yushu Zhang, Beijing (CN); Chunxuan Ye, San Diego, CA (US); Chunhai Yao, Beijing (CN); Hong He, San Jose, CA (US); Oghenekome Oteri, San Diego, CA (US); Huaning Niu, San Jose, CA (US); Wei Zeng, Saratoga, CA (US); Haitong Sun, Cupertino, CA (US); Seyed Ali Akbar Fakoorian, San Diego, CA (US)

(73) Assignee: Apple Inc., Cupertino, CA (US)

( * ) Notice: Subject to any disclaimer, the term of this patent is extended or adjusted under 35 U.S.C. 154(b) by 394 days.

(21) Appl. No.: 18/118,960

(22) Filed: Mar. 8, 2023

(65) Prior Publication Data

US 2023/0300832 A1 Sep. 21, 2023

Related U.S. Application Data

(60) Provisional application No. 63/321,061, filed on Mar. 17, 2022.

(51) Int. Cl.
*H04W 72/1268* (2023.01)
*H04W 72/231* (2023.01)

(52) U.S. Cl.
CPC ..... *H04W 72/1268* (2013.01); *H04W 72/231* (2023.01)

(58) Field of Classification Search
CPC .. H04B 7/0404; H04B 7/0413; H04B 7/0639; H04B 7/0695; H04B 7/0874;
(Continued)

(56) References Cited

U.S. PATENT DOCUMENTS

| 11,075,734 B2 | 7/2021 | Ko et al. | |
| 11,122,622 B2 * | 9/2021 | Hosseini | H04L 1/1812 |

(Continued)

FOREIGN PATENT DOCUMENTS

| CN | 115004830 A | * | 9/2022 | H04L 1/1614 |
| CN | 115362653 A | * | 11/2022 | H04L 5/0044 |

(Continued)

OTHER PUBLICATIONS

U.S. Appl. No. 18/118,957, filed Mar. 8, 2023, Zhang et al.
ITL "DRMS pattern configuration for NR," 3GPP TSG RAN WG1 NR #2, R1-1711350, Qingdao, China, Jun. 27-30, 2017, 4 pages.

*Primary Examiner* — Eric Nowlin
(74) *Attorney, Agent, or Firm* — Fish & Richardson P.C.

(57) ABSTRACT

Disclosed are methods, systems, and computer-readable medium to perform operations including: receiving downlink control information (DCI) scheduling a first physical uplink shared channel (PUSCH) transmission to be transmitted by a first antenna panel of the UE, and a second PUSCH transmission to be transmitted by a second antenna panel of the UE, receiving data indicative of at least two transmission configuration indicator (TCI) states, the at least two TCI states including a first TCI state indicating a beam of the first antenna panel for transmission of the first PUSCH transmission, and a second TCI state indicating a beam of the second antenna panel for transmission of the second PUSCH transmission, and transmitting the first PUSCH transmission using the beam of the first antenna panel and the second PUSCH transmission using the beam of the second antenna panel.

16 Claims, 8 Drawing Sheets

100

(58) Field of Classification Search

CPC ..... H04B 7/088; H04L 5/0025; H04L 5/0044; H04L 5/0051; H04L 5/0053; H04L 5/0094; H04W 72/0453; H04W 72/046; H04W 72/1268; H04W 72/231; H04W 72/232

See application file for complete search history.

(56) References Cited

U.S. PATENT DOCUMENTS

| | | | | |
|---|---|---|---|---|
| 11,558,873 B2 * | 1/2023 | Lin | | H04L 1/0003 |
| 11,606,814 B2 * | 3/2023 | Hosseini | | H04W 74/0858 |
| 12,057,913 B2 * | 8/2024 | Yuan | | H04B 7/0639 |
| 12,150,122 B2 * | 11/2024 | Huang | | H04L 5/001 |
| 12,232,105 B2 * | 2/2025 | Huang | | H04W 72/1268 |
| 2018/0042004 A1 * | 2/2018 | Beluri | | H04L 1/1671 |
| 2018/0278395 A1 | 9/2018 | Yoon | | |
| 2020/0028647 A1 | 1/2020 | Kim et al. | | |
| 2020/0204335 A1 | 6/2020 | Kim et al. | | |
| 2020/0314900 A1 * | 10/2020 | Hosseini | | H04L 1/1812 |
| 2020/0344805 A1 * | 10/2020 | Hosseini | | H04W 72/56 |
| 2021/0160879 A1 * | 5/2021 | Lin | | H04W 72/0453 |
| 2021/0226680 A1 * | 7/2021 | Khoshnevisan | | H04B 7/0404 |
| 2021/0328751 A1 * | 10/2021 | Eger | | H04L 27/2614 |
| 2022/0201679 A1 * | 6/2022 | Lim | | H04W 8/12 |
| 2022/0210814 A1 * | 6/2022 | Khoshnevisan | | H04L 5/0055 |
| 2022/0232590 A1 * | 7/2022 | Huang | | H04W 72/1268 |
| 2022/0287059 A1 * | 9/2022 | Huang | | H04W 52/146 |
| 2022/0330258 A1 * | 10/2022 | Xiao | | H04L 5/0057 |
| 2023/0052449 A1 * | 2/2023 | Yuan | | H04B 7/0404 |
| 2023/0076139 A1 * | 3/2023 | Muruganathan | | H04L 5/0023 |
| 2023/0127731 A1 * | 4/2023 | Yuan | | H04W 72/23 |
| | | | | 370/329 |
| 2023/0156735 A1 * | 5/2023 | Ying | | H04L 1/1614 |
| | | | | 370/329 |
| 2023/0179281 A1 * | 6/2023 | Svedman | | H04L 5/0094 |
| | | | | 455/101 |
| 2023/0189159 A1 * | 6/2023 | Chen | | H04L 5/0035 |
| | | | | 370/329 |
| 2023/0262692 A1 * | 8/2023 | Lin | | H04W 72/566 |
| | | | | 370/329 |
| 2023/0276414 A1 * | 8/2023 | Hao | | H04B 7/061 |
| | | | | 370/330 |
| 2023/0344555 A1 * | 10/2023 | Yuan | | H04W 72/23 |
| 2024/0032040 A1 * | 1/2024 | Fakoorian | | H04L 5/0053 |
| 2024/0073890 A1 * | 2/2024 | Matsumura | | H04B 7/0404 |
| 2024/0129932 A1 * | 4/2024 | Gao | | H04B 7/0478 |
| 2024/0214041 A1 * | 6/2024 | Yuan | | H04B 7/0473 |
| 2024/0215019 A1 * | 6/2024 | Gao | | H04W 52/146 |
| 2024/0322974 A1 * | 9/2024 | Deghel | | H04L 5/0053 |
| 2024/0357584 A1 * | 10/2024 | Gao | | H04L 5/0035 |
| 2024/0389096 A1 * | 11/2024 | Chen | | H04L 5/0055 |
| 2024/0429986 A1 * | 12/2024 | Bai | | H04L 1/1896 |
| 2025/0016752 A1 * | 1/2025 | Deghel | | H04L 5/0053 |
| 2025/0097956 A1 * | 3/2025 | Khoshnevisan | | H04W 72/232 |
| 2025/0150223 A1 * | 5/2025 | Karjalainen | | H04L 25/03955 |

FOREIGN PATENT DOCUMENTS

| | | | | | |
|---|---|---|---|---|---|
| CN | 116782385 A | * | 9/2023 | | |
| CN | 115362653 B | * | 5/2024 | | H04L 5/0094 |
| CN | 119096636 A | * | 12/2024 | | H04L 1/08 |
| CN | 119256602 A | * | 1/2025 | | H04W 72/23 |
| CN | 119678378 A | * | 3/2025 | | H04L 25/03866 |
| EP | 4228366 A1 | * | 8/2023 | | H04W 72/121 |
| ES | 2988380 T3 | * | 11/2024 | | H04W 72/12 |
| GB | 2635189 A | * | 5/2025 | | H04L 25/03955 |
| JP | 2023510639 A | * | 3/2023 | | H04L 5/0051 |
| JP | 7520992 B2 | * | 7/2024 | | H04W 72/12 |
| KR | 20240161840 A | * | 11/2024 | | H04L 1/08 |
| KR | 20240167694 A | * | 11/2024 | | H04L 5/0051 |
| WO | WO-2021101207 A1 | * | 5/2021 | | H04W 72/535 |
| WO | WO 2021/159065 | | 8/2021 | | |
| WO | WO-2021192659 A1 | * | 9/2021 | | H04W 72/231 |
| WO | WO 2021/227958 | | 11/2021 | | |
| WO | WO 2021/231522 | | 11/2021 | | |
| WO | WO-2023206458 A1 | * | 11/2023 | | H04L 1/08 |

* cited by examiner

200

250

300

350

400

450

Figure 5:
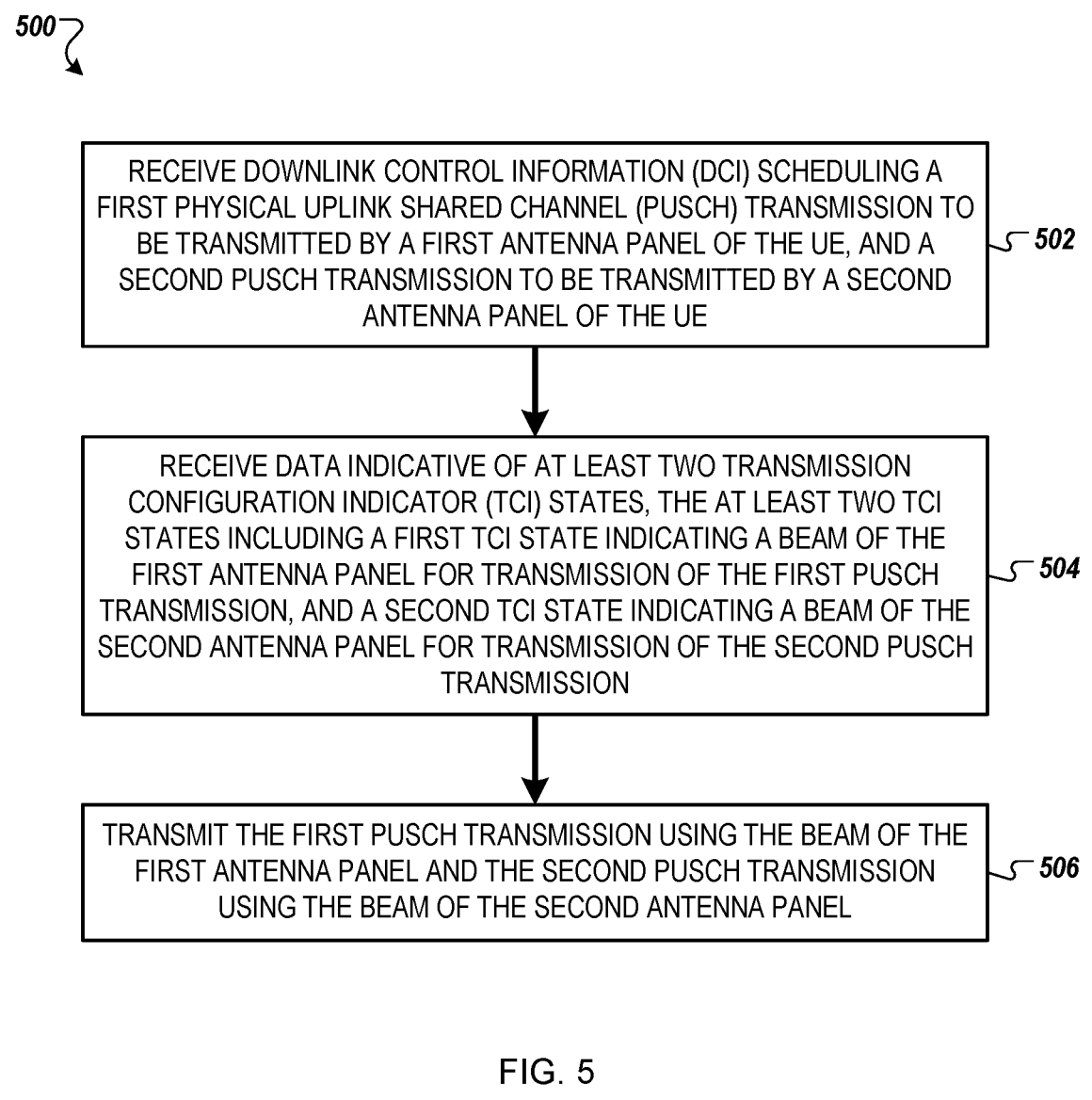

500

RECEIVE DOWNLINK CONTROL INFORMATION (DCI) SCHEDULING A FIRST PHYSICAL UPLINK SHARED CHANNEL (PUSCH) TRANSMISSION TO BE TRANSMITTED BY A FIRST ANTENNA PANEL OF THE UE, AND A SECOND PUSCH TRANSMISSION TO BE TRANSMITTED BY A SECOND ANTENNA PANEL OF THE UE — 502

RECEIVE DATA INDICATIVE OF AT LEAST TWO TRANSMISSION CONFIGURATION INDICATOR (TCI) STATES, THE AT LEAST TWO TCI STATES INCLUDING A FIRST TCI STATE INDICATING A BEAM OF THE FIRST ANTENNA PANEL FOR TRANSMISSION OF THE FIRST PUSCH TRANSMISSION, AND A SECOND TCI STATE INDICATING A BEAM OF THE SECOND ANTENNA PANEL FOR TRANSMISSION OF THE SECOND PUSCH TRANSMISSION — 504

TRANSMIT THE FIRST PUSCH TRANSMISSION USING THE BEAM OF THE FIRST ANTENNA PANEL AND THE SECOND PUSCH TRANSMISSION USING THE BEAM OF THE SECOND ANTENNA PANEL — 506

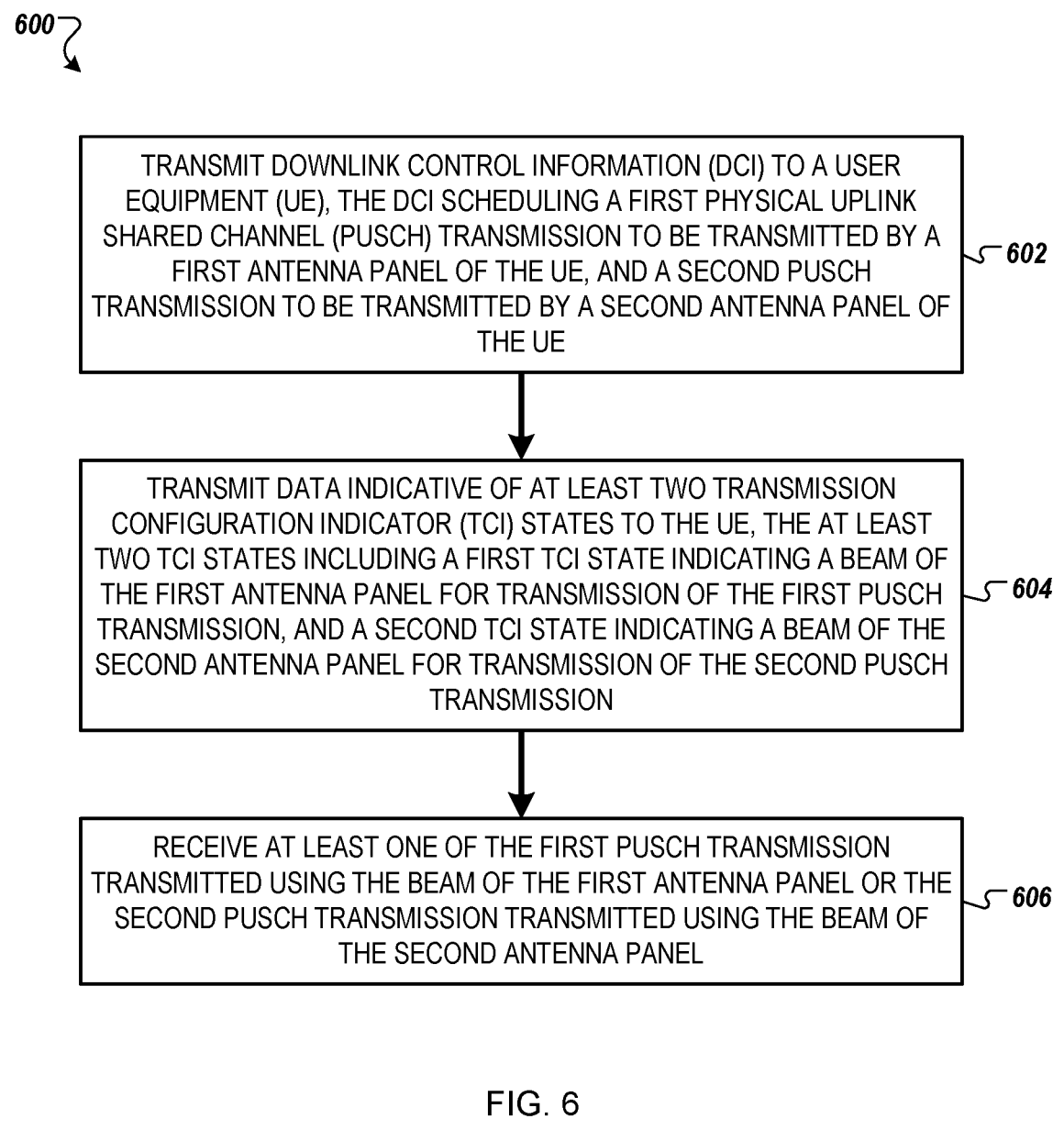

TRANSMIT DOWNLINK CONTROL INFORMATION (DCI) TO A USER EQUIPMENT (UE), THE DCI SCHEDULING A FIRST PHYSICAL UPLINK SHARED CHANNEL (PUSCH) TRANSMISSION TO BE TRANSMITTED BY A FIRST ANTENNA PANEL OF THE UE, AND A SECOND PUSCH TRANSMISSION TO BE TRANSMITTED BY A SECOND ANTENNA PANEL OF THE UE ⟋ 602

TRANSMIT DATA INDICATIVE OF AT LEAST TWO TRANSMISSION CONFIGURATION INDICATOR (TCI) STATES TO THE UE, THE AT LEAST TWO TCI STATES INCLUDING A FIRST TCI STATE INDICATING A BEAM OF THE FIRST ANTENNA PANEL FOR TRANSMISSION OF THE FIRST PUSCH TRANSMISSION, AND A SECOND TCI STATE INDICATING A BEAM OF THE SECOND ANTENNA PANEL FOR TRANSMISSION OF THE SECOND PUSCH TRANSMISSION ⟋ 604

RECEIVE AT LEAST ONE OF THE FIRST PUSCH TRANSMISSION TRANSMITTED USING THE BEAM OF THE FIRST ANTENNA PANEL OR THE SECOND PUSCH TRANSMISSION TRANSMITTED USING THE BEAM OF THE SECOND ANTENNA PANEL ⟋ 606

FIG. 6

ENHANCED SINGLE-DCI MULTI-PANEL UPLINK TRANSMISSIONS

CROSS-REFERENCE TO RELATED APPLICATIONS

This application claims priority to and the benefit of U.S. Provisional Patent Application No. 63/321,061, filed Mar. 17, 2022, the entire contents of which is incorporated herein by reference.

BACKGROUND

Wireless communication networks provide integrated communication platforms and telecommunication services to wireless user devices. Example telecommunication services include telephony, data (e.g., voice, audio, and/or video data), messaging, internet-access, and/or other services. The wireless communication networks have wireless access nodes that exchange wireless signals with the wireless user devices using wireless network protocols, such as protocols described in various telecommunication standards promulgated by the Third Generation Partnership Project (3GPP). Example wireless communication networks include code division multiple access (CDMA) networks, time division multiple access (TDMA) networks, frequency-division multiple access (FDMA) networks, orthogonal frequency-division multiple access (OFDMA) networks, Long Term Evolution (LTE), and Fifth Generation New Radio (5G NR). The wireless communication networks facilitate mobile broadband service using technologies such as OFDM, multiple input multiple output (MIMO), advanced channel coding, massive MIMO, beamforming, and/or other features.

SUMMARY

The present disclosure provides for enhanced single-DCI-based multi-panel uplink transmissions by enabling the scheduling of PUSCH transmissions and indication of transmission parameters at the panel level.

In general, in an aspect, a method to be performed by a user equipment (UE) includes receiving downlink control information (DCI) scheduling a first physical uplink shared channel (PUSCH) transmission to be transmitted by a first antenna panel of the UE, and a second PUSCH transmission to be transmitted by a second antenna panel of the UE, receiving data indicative of at least two transmission configuration indicator (TCI) states, the at least two TCI states including a first TCI state indicating a beam of the first antenna panel for transmission of the first PUSCH transmission, and a second TCI state indicating a beam of the second antenna panel for transmission of the second PUSCH transmission, and transmitting the first PUSCH transmission using the beam of the first antenna panel and the second PUSCH transmission using the beam of the second antenna panel.

Other versions include corresponding systems, apparatus, and computer programs configured to perform the actions of methods defined by instructions encoded on computer-readable storage devices. These and other versions may optionally include one or more of the following features.

In some examples, transmitting the first and second PUSCH transmissions includes: transmitting the first PUSCH transmission using the beam of the first antenna panel to a first transmission/reception point (TRP), and transmitting the second PUSCH transmission using the beam of the second antenna panel to a second TRP that is different from the first TRP.

In some examples, an indication of a multiplexing scheme for transmission of the first and second PUSCH transmissions is received, and transmitting the first and second PUSCH transmissions includes transmitting the first and second PUSCH transmissions according to the multiplexing scheme.

In some examples, the indication of the multiplexing scheme is received by the DCI, by radio resource control (RRC) signaling, or by a medium access control (MAC) control element (CE).

In some examples, the multiplexing scheme includes a frequency domain multiplexing (FDM) repetition scheme, a FDM beam hopping scheme, a spatial domain multiplexing (SDM) repetition scheme, or a SDM multiplexing scheme.

In some examples, the multiplexing scheme is an FDM repetition scheme or an SDM repetition scheme, and a transport block size (TBS) for the first and second PUSCH transmissions is determined based at least in part on a number of subcarriers used for at least one of the first PUSCH transmission or the second PUSCH transmission.

In some examples, the at least two TCI states are unified TCI states.

In some examples, one or more first power control parameters are determined based on the first TCI state, one or more second power control parameters are determined based on the second TCI state, and the first PUSCH transmission is transmitted using the beam of the first antenna panel in accordance with the one or more first power control parameters, and the second PUSCH transmission is transmitted using the beam of the second antenna panel in accordance with the one or more second power control parameters.

In some examples, an actual transmission power for at least one of the first PUSCH transmission and the second PUSCH transmission is determined, and a power headroom is determined based on a difference between a maximum transmission power for the UE and the actual transmission power.

In some examples, the maximum transmission power is a panel-specific maximum transmission power, and the power headroom is determined based on a difference between the panel-specific maximum transmission power and the actual transmission power for one of the first or second PUSCH transmissions.

In some examples, the maximum transmission power is a UE-specific maximum transmission power, and the power headroom is determined based on a difference between the UE-specific maximum transmission power and the actual transmission power of both the first and second PUSCH transmissions.

In some examples, an indication of a first number of layers for transmission of the first PUSCH transmission and a second number of layers for transmission of the second PUSCH transmission is received, where the first number of layers if equal to the second number of layers.

In some examples, at least one of a number of layers, a modulation and coding scheme (MCS), a redundancy value (RV), a hybrid automatic repeat request (HARD) process, a new data indicator, or a phase tracking reference signal (PTRS) to demodulation reference signal (DMRS) association for the beam of the first antenna panel and the beam of the second antenna panel are different.

In some examples, an indication of a transmission rank indicator (TRI) and a transmission precoder matrix index (TPMI) are received, where the TRI and the TPMI are jointly coded.

In some examples, a demodulation reference signal (DMRS) port for each of the first and second antenna panels is different.

In general, in an aspect, a method to be performed by a base station includes transmitting DCI to a UE, the DCI scheduling a first PUSCH transmission to be transmitted by a first antenna panel of the UE, and a second PUSCH transmission to be transmitted by a second antenna panel of the UE, transmitting data indicative of at least two TCI states to the UE, the at least two TCI states including a first TCI state indicating a beam of the first antenna panel for transmission of the first PUSCH transmission, and a second TCI state indicating a beam of the second antenna panel for transmission of the second PUSCH transmission, receiving at least one of the first PUSCH transmission transmitted using the beam of the first antenna panel or the second PUSCH transmission transmitted using the beam of the second antenna panel.

Other versions include corresponding systems, apparatus, and computer programs configured to perform the actions of methods defined by instructions encoded on computer-readable storage devices. These and other versions may optionally include one or more of the following features.

In some examples, an indication of a multiplexing scheme for transmission of the first and second PUSCH transmissions is transmitted to the UE.

In some examples, the indication of the multiplexing scheme is transmitted in the DCI, by RRC signaling, or by a MAC-CE.

In some examples, the multiplexing scheme is an FDM repetition scheme, an FDM beam hopping scheme, an SDM repetition scheme, or an SDM multiplexing scheme.

In some examples, the multiplexing scheme is an FDM repetition scheme or an SDM repetition scheme, and data indicative of a redundancy value (RV) for each of the beam of the first antenna panel and the beam of the second panel is transmitted to the UE, or data indicative of an RV for the beam of the first antenna panel and an RV offset for the beam of the second antenna panel is transmitted to the UE.

In some examples, the multiplexing scheme is an SDM repetition scheme or an SDM multiplexing scheme, and data indicative of a maximum number of layers for each of the first antenna panel and the second antenna panel is received, and an indication of a number of layers for transmission of the first PUSCH transmission and the second PUSCH transmission is transmitted to the UE.

In some examples, the at least two TCI states are unified TCI states.

In some examples, data indicative of a maximum transmission power for each of the first antenna panel and the second antenna panel is received, and the DCI includes a transmission power command (TPC) for the first PUSCH transmission to be transmitted by the first antenna panel of the UE and the second PUSCH transmission to be transmitted by the second antenna panel of the UE, in which the TPC is determined based at least in part on the maximum transmission power for each of the first antenna panel and the second antenna panel.

In some examples, an indication of a first number of layers for transmission of the first PUSCH transmission and a second number of layers for transmission of the second PUSCH transmission is transmitted to the UE, where the first number of layers if equal to the second number of layers.

In some examples, at least one of a number of layers, a MCS, a RV, a HARQ process, a new data indicator, or a PTRS to DMRS association for the beam of the first antenna panel and the beam of the second antenna panel are different.

In some examples, an indication of a TRI and a TPMI are transmitted to the UE, where the TRI and the TPMI are jointly coded.

In some examples, a DMRS port for each of the first and second antenna panels is different.

The details of one or more embodiments of these systems and methods are set forth in the accompanying drawings and the description below. Other features, objects, and advantages of these systems and methods will be apparent from the description and drawings, and from the claims.

BRIEF DESCRIPTION OF THE FIGURES

FIGS. 5 and 6 illustrate flowcharts of example processes, in accordance with some embodiments.

DETAILED DESCRIPTION

Figure 1:
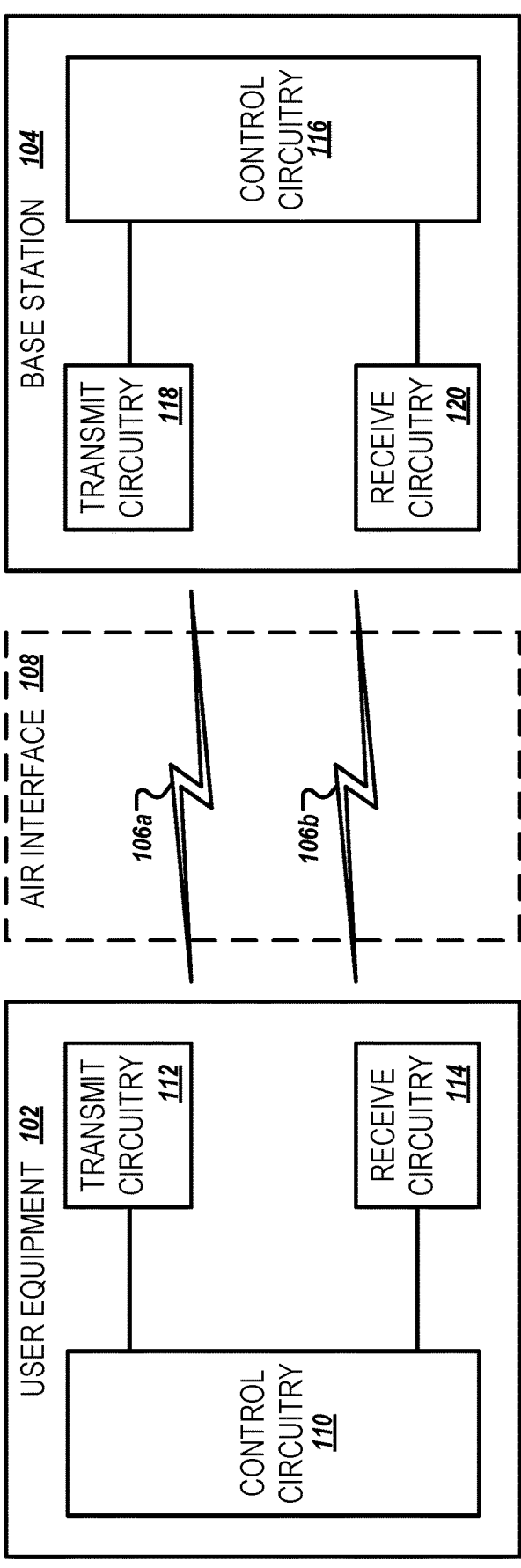
FIG. 1 illustrates a wireless network, in accordance with some embodiments.

In order to increase network coverage, reliability, and data rates, some wireless communication networks support multiple transmission/reception point (multi-TRP) operation. In these networks, one or more base stations may act as or otherwise utilize multiple TRPs to communicate with a user equipment (UE). To facilitate multi-TRP operation, the TRPs (e.g., the base stations) and the UE can each include multiple antennas or antenna panels, with each panel having multiple antenna elements or beams.

In general, there are two different operating modes for multi-TRP: single-DCI, and multi-DCI. In single-DCI mode, a base station can trigger a UE to transmit one or more physical uplink shared channel (PUSCH) repetitions (among other uplink data) towards two TRPs based on one DCI. For example, in a codebook-based transmission scheme, the base station can provide two sounding reference signal (SRS) resource indicators (SRIs) and two transmission precoder matrix indices (TPMIs) to the UE in one DCI. The SRIs are used for beam indication, and the TPMIs are used for precoder indication. In a non-codebook-based transmission scheme, the base station can provide two SRIs that are used for both beam and precoder indication (e.g., by inferring the precoder from the SRS indicated by the SRI). After receipt of the DCI, the UE can use the indicated beams and precoders to transmit the PUSCH repetitions according to a time domain multiplexing (TDM) scheme.

However, this approach does not allow the network and the UE to coordinate multi-TRP PUSCH transmissions at the panel level. In particular, the network is not able to indicate information such as the PUSCH multiplexing scheme, the precoder, or the beam for PUSCH transmissions by each UE panel. As a result, existing wireless communication networks using the above-noted approach do not support simultaneous multi-panel PUSCH transmissions based on a single DCI. In addition, UE behavior for uplink power control and actual power headroom reporting in multi-panel implementations is currently undefined in existing wireless communication standards.

Some wireless communication networks utilize a unified transmission configuration indicator (TCI) framework, which provides another avenue for uplink beam indication and power control parameter indication for PUSCH and physical uplink control channel (PUCCH) transmissions. However, under the current unified TCI framework (e.g., as defined in Release 17 of the 3GPP 5G NR standard), a single TCI is indicated for all PUSCH transmissions by the UE. As a result, the current unified TCI framework does not support multi-TRP operation.

The present disclosure provides for enhanced single-DCI-based multi-panel uplink transmissions by enabling the scheduling of PUSCH transmissions and indication of transmission parameters at the panel level. In some examples, a base station uses a single DCI to schedule PUSCH transmissions from multiple UE panels. A unified TCI framework can be used to indicate the beam(s) for transmission of the PUSCH by each panel. In some examples, the multiplexing schemes available to the UE for PUSCH transmission can be expanded in Release 18 to include frequency domain multiplexing (FDM) and spatial domain multiplexing (SDM) schemes in addition to the existing TDM scheme in Release 17, and an indication of a selected multiplexing scheme can be provided by the base station. Also, in some examples, UE behavior for uplink power control and actual power headroom reporting in multi-panel implementations is defined. As a result of these and other aspects of the present disclosure, the reliability and data rate of single-DCI-based multi-panel uplink transmissions can be improved, among other benefits.

FIG. 1 illustrates a wireless network 100, in accordance with some embodiments. The wireless network 100 includes a UE 102 and a base station 104 connected via one or more channels 106A, 106B across an air interface 108. The UE 102 and base station 104 communicate using a system that supports controls for managing the access of the UE 102 to a network via the base station 104.

For purposes of convenience and without limitation, the wireless network 100 is described in the context of Long Term Evolution (LTE) and Fifth Generation New Radio (5G NR) communication standards as defined by the Third Generation Partnership Project (3GPP) technical specifications. More specifically, the wireless network 100 is described in the context of a Non-Standalone (NSA) networks that incorporate both LTE and NR, for example, E-UTRA (Evolved Universal Terrestrial Radio Access)-NR Dual Connectivity (EN-DC) networks, and NE-DC networks. However, the wireless network 100 may also be a Standalone (SA) network that incorporates only NR. Furthermore, other types of communication standards are possible, including future 3GPP systems (e.g., Sixth Generation (6G)) systems, Institute of Electrical and Electronics Engineers (IEEE) 802.11 technology (e.g., IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies), IEEE 802.16 protocols (e.g., WMAN, WiMAX, etc.), or the like. While aspects may be described herein using terminology commonly associated with 5G NR, aspects of the present disclosure can be applied to other systems, such as 3G, 4G, and/or systems subsequent to 5G (e.g., 6G).

In the wireless network 100, the UE 102 and any other UE in the system may be, for example, laptop computers, smartphones, tablet computers, machine-type devices such as smart meters or specialized devices for healthcare monitoring, remote security surveillance systems, intelligent transportation systems, or any other wireless devices with or without a user interface. In network 100, the base station 104 provides the UE 102 network connectivity to a broader network (not shown). This UE 102 connectivity is provided via the air interface 108 in a base station service area provided by the base station 104. In some embodiments, such a broader network may be a wide area network operated by a cellular network provider, or may be the Internet. Each base station service area associated with the base station 104 is supported by antennas integrated with the base station 104. The service areas are divided into a number of sectors associated with certain antennas. Such sectors may be physically associated with fixed antennas or may be assigned to a physical area with tunable antennas or antenna settings adjustable in a beamforming process used to direct a signal to a particular sector.

The UE 102 includes control circuitry 110 coupled with transmit circuitry 112 and receive circuitry 114. The transmit circuitry 112 and receive circuitry 114 may each be coupled with one or more antennas or antenna panels, with each panel having multiple antenna elements. The control circuitry 110 may be adapted to perform operations associated with selection of codecs for communication and to adaption of codecs for wireless communications as part of system congestion control. The control circuitry 110 may include various combinations of application-specific circuitry and baseband circuitry. The transmit circuitry 112 and receive circuitry 114 may be adapted to transmit and receive data, respectively, and may include radio frequency (RF) circuitry or front-end module (FEM) circuitry, including communications using codecs as described herein.

In various embodiments, aspects of the transmit circuitry 112, receive circuitry 114, and control circuitry 110 may be integrated in various ways to implement the circuitry described herein. The control circuitry 110 may be adapted or configured to perform various operations such as those described elsewhere in this disclosure related to a UE. The transmit circuitry 112 may transmit a plurality of multiplexed uplink physical channels. The plurality of uplink physical channels may be multiplexed according to time division multiplexing (TDM) or frequency division multiplexing (FDM) along with carrier aggregation. The transmit circuitry 112 may be configured to receive block data from the control circuitry 110 for transmission across the air interface 108. Similarly, the receive circuitry 114 may receive a plurality of multiplexed downlink physical channels from the air interface 108 and relay the physical channels to the control circuitry 110. The plurality of downlink physical channels may be multiplexed according to TDM or FDM along with carrier aggregation. The transmit circuitry 112 and the receive circuitry 114 may transmit and receive both control data and content data (e.g., messages, images, video, etc.) structured within data blocks that are carried by the physical channels.

FIG. 1 also illustrates the base station 104. In embodiments, the base station 104 may be an NG radio access network (RAN) or a 5G RAN, an E-UTRAN, a non-terrestrial cell, or a legacy RAN, such as a UTRAN or GERAN. As used herein, the term "NG RAN" or the like may refer to the base station 104 that operates in an NR or 5G wireless network 100, and the term "E-UTRAN" or the like may refer to a base station 104 that operates in an LTE or 4G wireless network 100. The UE 102 utilizes connections (or channels) 106A, 106B, each of which includes a physical communications interface or layer.

The base station 104 circuitry may include control circuitry 116 coupled with transmit circuitry 118 and receive circuitry 120. The transmit circuitry 118 and receive circuitry 120 may each be coupled with one or more antennas that may be used to enable communications via the air interface 108.

The control circuitry 116 may be adapted to perform operations for analyzing and selecting codecs, managing congestion control and bandwidth limitation communications from a base station, determining whether a base station is codec aware, and communicating with a codec-aware base station to manage codec selection for various communication operations described herein. The transmit circuitry 118 and receive circuitry 120 may be adapted to transmit and receive data, respectively, to any UE connected to the base station 104 using data generated with various codecs described herein. The transmit circuitry 118 may transmit downlink physical channels includes of a plurality of downlink subframes. The receive circuitry 120 may receive a plurality of uplink physical channels from various UEs, including the UE 102.

In this example, the one or more channels 106A, 106B are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, an Advanced long term evolution (LTE-A) protocol, a LTE-based access to unlicensed spectrum (LTE-U), a 5G protocol, a NR protocol, an NR-based access to unlicensed spectrum (NR-U) protocol, and/or any of the other communications protocols discussed herein. In embodiments, the UE 102 may directly exchange communication data via a ProSe interface. The ProSe interface may alternatively be referred to as a SL interface and may include one or more logical channels, including but not limited to a PSCCH, a PSSCH, a PSDCH, and a PSBCH.

In accordance with an aspect of the present disclosure, a UE (e.g., the UE 102) is configured (e.g., by a base station, such as the base station 104) to perform enhanced single-DCI-based multi-panel uplink PUSCH transmissions. In some examples, the base station can use a single DCI to schedule PUSCH transmission from multiple panels of the UE. For example, the base station can use a new DCI format or an existing DCI format, such as DCI format 0_1 or 0_2, with field(s) to indicate the PUSCH scheduling for two (or more) panels of the UE. Additional details regarding the DCI transmitted by the base station are discussed below.

The base station can also indicate two or more unified TCI states, in which each TCI is used to provide a beam indication for a panel of the UE. The TCI states can be indicted by, for example, MAC CE or DCI format 1_1/1_2. In some examples, the base station can separately indicate the TCI states for PUSCH transmissions scheduled by different DCI formats. For example, the base station can indicate two TCI states for PUSCH transmissions scheduled by DCI format 0_1, and one TCI state from the two TCI indicated states for PUSCH transmissions scheduled by DCI format 0_2. In this way, dynamic switching of the transmission scheme for PUSCH transmissions can be achieved (e.g., some PUSCH transmissions can be transmitted according to two TCI, while other PUSCH transmissions can be transmitted according to one TCI). In some examples, if only one TCI is provided for a certain DCI format, the UE can assume that the DCI schedules single-TRP operation.

The technology described here also enables indication of a multiplexing scheme for single-DCI based multi-panel PUSCH transmissions. In some examples, the multiplexing scheme (e.g., FDM, SDM, TDM, etc.) can be indicated by higher layer signaling, such as by RRC signaling or MAC CE. In some examples, the multiplexing scheme can be indicated by the scheduling DCI. For example, the multiplexing scheme can be configured in each time domain resource allocation (TDRA) in a TDRA list configured by RRC. Then, the base station can use the TDRA indicator in the scheduling DCI to indicate the multiplexing scheme.

In some examples, a separate indicator in the DCI can be used to indicate the multiplexing scheme. For example, a DCI field "SRS resource set indicator" can be used to indicate the multiplexing scheme and/or switching between schemes. This indicator can provide for some or all the following schemes: FDM repetition based multi-TRP, FDM beam hopping based multi-TRP, SDM repetition based multi-TRP, SDM spatial multiplexing based multi-TRP, TDM based multi-TRP, single-TRP with the first TCI, single-TRP with the second TCI, or combinations of them, among others. In some examples, the indicator (e.g., a DCI field "SRS resource indicator") can indicate the switching between a single frequency network (SFN) scheme and single-TRP transmission to support DCI-based dynamic switching between SFN scheme of single-DCI based simultaneous transmission across multiple panels (STxMP) PUSCH and single-TRP transmission. In some examples, the indicator (e.g., a 2-bit DCI field "SRS resource set indicator") can indicate the single-TRP or SDM transmission for dynamic switching between SDM scheme of single-DCI based STxMP PUSCH and single-TRP transmission. The base station can indicate one or more of these multiplexing schemes in the DCI transmitted to the UE. Additional details regarding these multiplexing schemes are as follows:

Scheme 1: single TRP with the first or second TCI. According to this scheme, a single panel indicated by the first or second TCI is used by the UE for PUSCH transmission. Selection of the panel indicated by the first or second TCI may be predefined, or indicated to the UE by DCI or higher layer signaling.

Figure 2A:
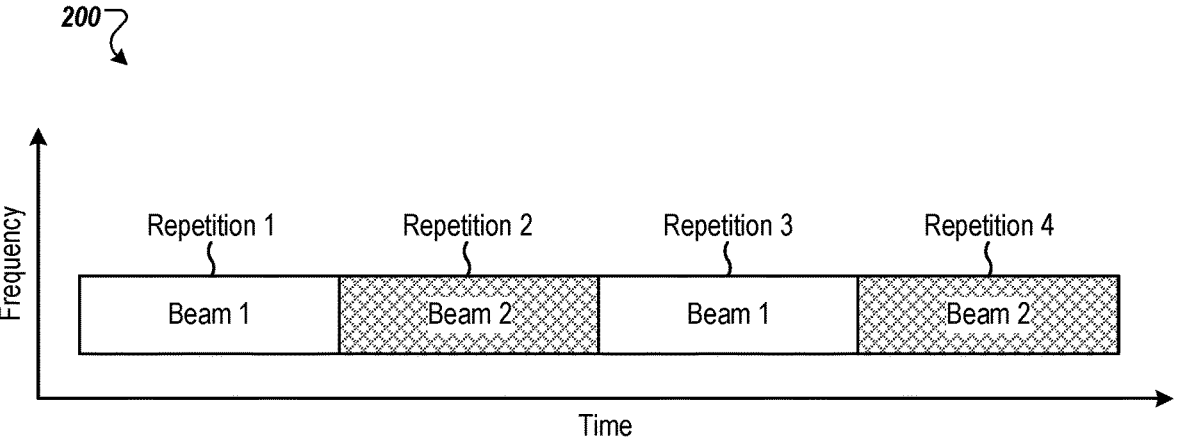
FIGS. 2A and 2B illustrate examples of time domain multiplexing (TDM) schemes, in accordance with some embodiments.
Figure 2B:
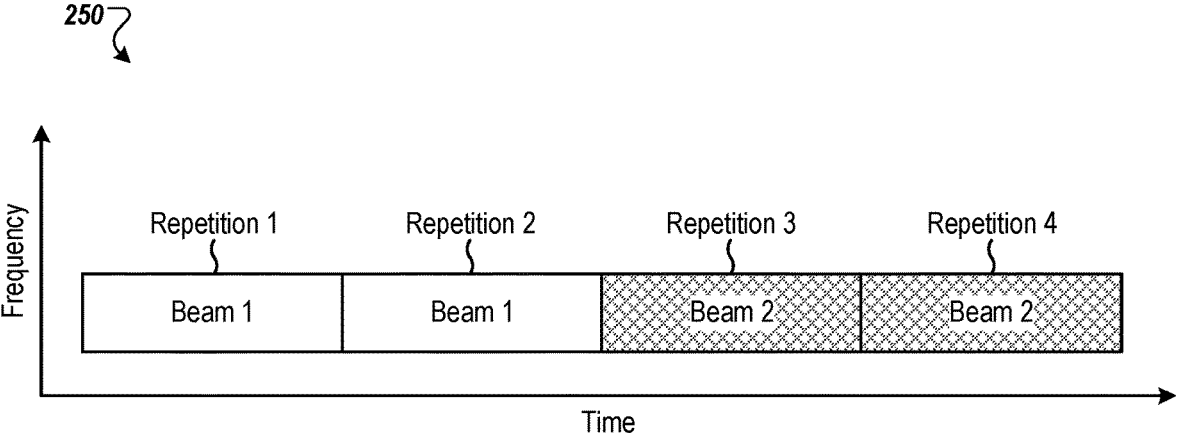

Scheme 2: TDM based multi-TRP, with the beam mapping order starting from the first or second TCI. According to this scheme, the UE uses TDM to transmit PUSCH repetitions from multiple panels, where the first beam is the one indicated by the first or second TCI. The first beam in the order can be predefined, or indicated to the UE by DCI or higher layer signaling. In some examples, the UE can be configured to transmit the PUSCH repetitions according to one of the multiplexing schemes shown in FIGS. 2A and 2B. For example, referring to FIG. 2A, the UE can be configured to transmit the PUSCH repetitions according to a cyclic multiplexing scheme 200 in which the UE alternates (or cycles) between a first beam (beam 1) and a second beam (beam 2) for each PUSCH repetition. Alternatively, the UE can be configured to transmit the PUSCH repetitions according to a sequential multiplexing scheme 250 in which a first beam (beam 1) is used for the first two PUSCH repetitions, and a second beam (beam 2) is used for the next two PUSCH repetitions. This same pattern can continue for the remaining PUSCH repetitions.

Figure 3A:
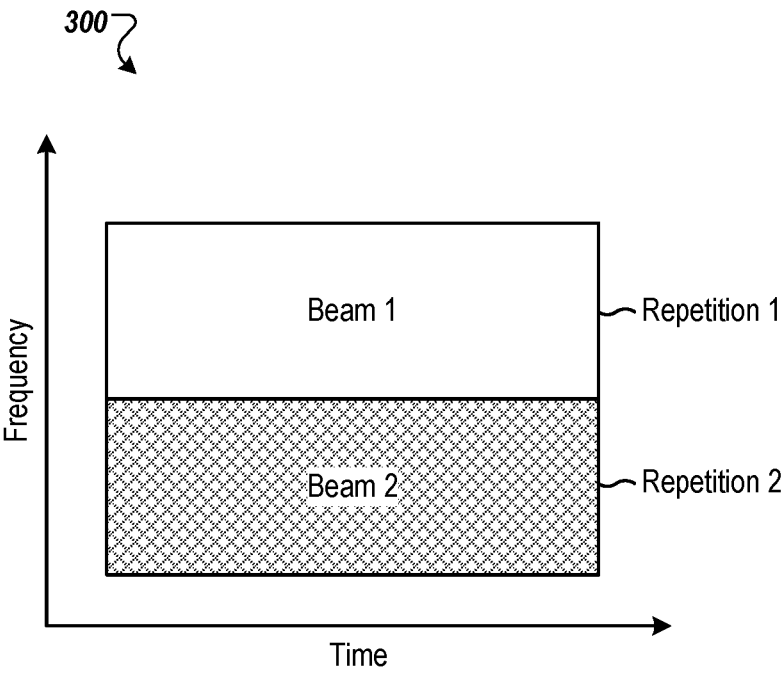
FIGS. 3A and 3B illustrate examples of frequency domain multiplexing (FDM) schemes, in accordance with some embodiments.

Scheme 3a: FDM repetition based multi-TRP, with beam mapping order starting from the first or second TCI. According to this scheme, the UE uses each panel to transmit a PUSCH repetition over the bandwidth allocated to the respective panel. In this way, the UE transmits the same information using each panel. For example, FIG. 3A illustrates an example of a FDM repetition based multi-TRP scheme 300 in which the UE transmits a first repetition using the first half of the allocated bandwidth on a first beam (beam 1), and the UE transmits a second repetition using the second half of the allocated bandwidth on a second beam (beam 2). Alternative bandwidth allocations can be used in some examples. For example, the mapping can be made at the resource block group (RBG) level, such as the first beam being mapped to odd RBGs, and the second beam being mapped to even RBGs.

Figure 3B:
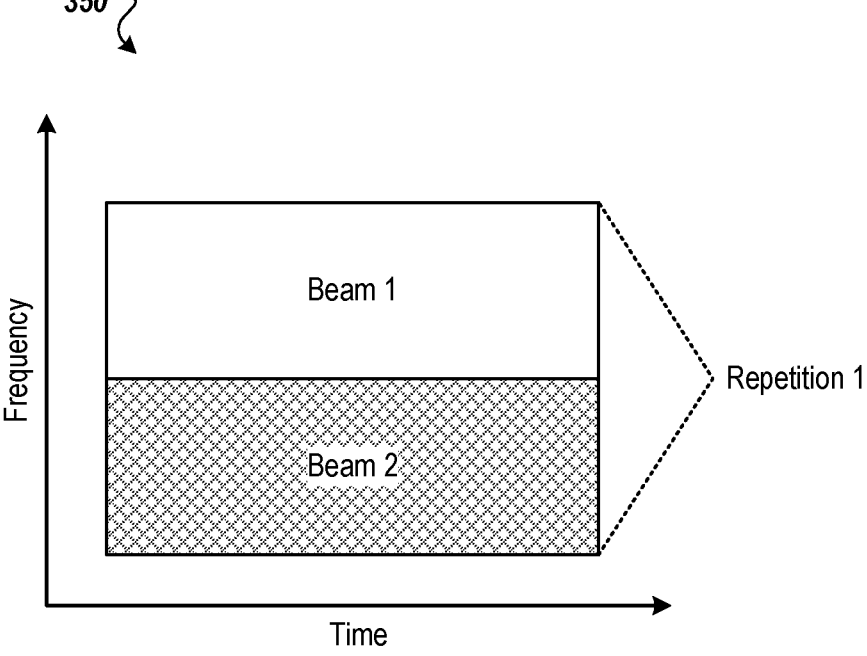

Scheme 3b: FDM beam hopping based multi-TRP, with beam mapping order starting from the first or second TCI. According to this scheme, the UE uses both panels to transmit a PUSCH repetition in a single transport block (TB) over the bandwidth allocated by the base station. In this way, the UE transmits different information using each panel. For example, FIG. 3B illustrates an example of a FDM beam hopping based multi-TRP scheme 350 in which a first beam (beam 1) is used for transmitting a first portion of a repetition using the first half of the allocated bandwidth, and a second beam (beam 2) is used for transmitting a second portion of the same repetition using the second half of the allocated bandwidth. As noted above with reference to scheme 3a, alternative bandwidth allocations, such as allocations at the RBG level, can be used in some examples.

Figure 4A:
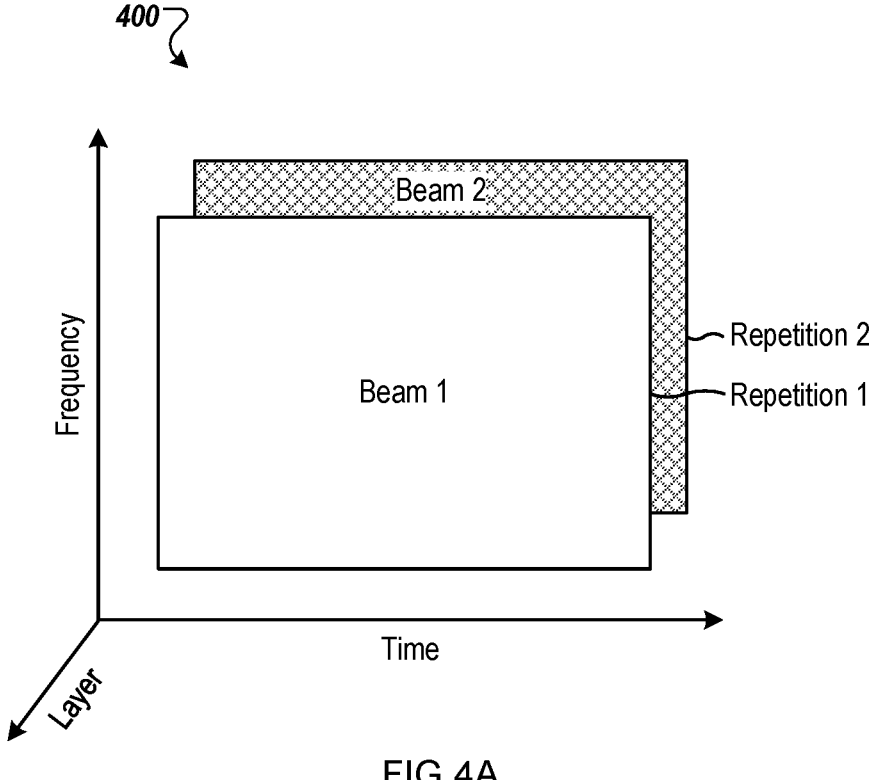
FIGS. 4A and 4B illustrate examples of spatial domain multiplexing (SDM) schemes, in accordance with some embodiments.

Scheme 4a: SDM repetition based multi-TRP, with beam mapping order starting from the first or second TCI. According to this scheme, the UE uses each panel to transmit a PUSCH repetition at the layers indicated for the panel. In this way, the UE transmits the same information using each panel. For example, FIG. 4A illustrates an example of a SDM repetition based multi-TRP scheme 400 in which a first beam (beam 1) is used for transmitting a first repetition at a layer allocated to the first beam, and a second beam (beam 2) is used for transmitting a second repetition at a different layer allocated to the second beam. In some examples, the first beam can be mapped to the first half of transmission layers, and the second beam can be mapped to the second half of transmissions layers.

Figure 4B:
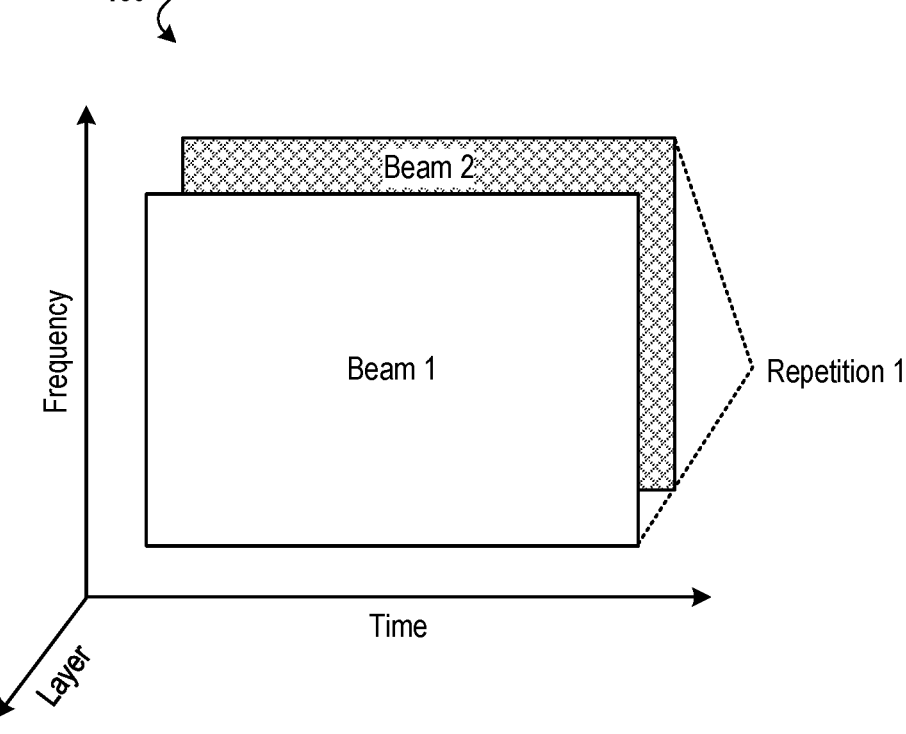

Scheme 4b: SDM multiplexing based multi-TRP, with beam mapping order starting from the first or second TCI. According to this scheme, the UE uses each panel to transmit a different portion of a PUSCH repetition. For example, FIG. 4B illustrates an example of a SDM multiplexing based multi-TRP scheme 450 in which a first beam (beam 1) is used for transmitting a first portion of a repetition at the layer allocated to the first beam, and a second beam (beam 2) is used for transmitting a second portion of the same repetition at a different layer allocated to the second beam. Because the information transmitted on each beam may be different, the number of layers allocated to each beam may also be different. For example, the first beam can be mapped to the first X layers, and the second beam can be mapped to the second Y layers, where the number of layers X and Y are not necessarily equal. In some examples, the X and Y layers can be mapped to one codeword or two codewords, among other mappings.

Note that information regarding the selection, mapping, or order of the first or second TCI in the schemes above can be predefined, or indicated by DCI or higher layer signaling. Similarly, the bandwidth and/or layers allocated to a panel/ beam can be indicated by DCI or higher layer signaling in some examples.

For schemes 3a and 4a, since the transport block size (TBS) should be determined based on the number of subcarriers used for PUSCH transmission, and because different PUSCH repetitions can be allocated a different number of subcarriers, it can be beneficial to provide a TBS indication (e.g., when scheme 3a or 4a is used). Accordingly, in some examples, the UE is configured to determine the TBS based on the number of subcarriers used for the first repetition. In some examples, the UE is configured to determine the TBS based on the number of subcarriers used for the second repetition. In some examples, the TBS is determined by the UE based on the minimum, maximum, or average number of subcarriers used across two or more repetitions.

Selection of one or more of the above-noted options for determining the TB S can be predefined, or configured by DCI or higher layer signal.

For schemes 3a and 4a, the repetitions can be sent using the same or different redundant versions (RVs). When different RVs are used, the RV sequences for each beam can be configured by higher layer signaling (e.g. RRC or MAC CE), or indicated by scheduling DCI. In some examples, the base station explicitly indicates the RV for each beam to the UE. In some examples, the base station explicitly indicates the RV for the first beam, and a RV offset for the second beam. The RV for the second beam can then be determined by the UE as (RV for the first beam+RV offset) mod (maximum RV). In some examples, the overall RV sequence for both beams are provided, and the RV for the first beam can use the odd indexed RV in the sequence, while the RV for the second beam can use the even indexed RV in the sequence (or vice versa).

In some examples, for schemes 3a, 3b and 4a, the number of layers for each beam can be the same. In this example, only the second TPMI may be provided when a codebook-based transmission scheme is used. For a non-codebook-based transmission scheme, the number of indicated SRS Resources indicated by two SRIs can be the same. In some examples, the number of layers is indicated by the first SRI field (e.g., for non-codebook-based transmission schemes) or the first TPMI (e.g., for codebook-based transmission schemes).

For scheme 4b, the number of layers, modulation and coding scheme (MCS), RV, hybrid automatic repeat request (HARD) process, new data indicator, and/or phase tracking reference signal (PTRS) to demodulation reference signal (DMRS) association for each beam can be different. Thus, for a codebook-based transmission scheme, the base station can indicate a second transmission rank indicator (TRI) in addition to the second TPMI, where the second TRI and TPMI can be jointly coded. In some examples, for codebook-based transmission schemes, DCI can indicate two TPMI fields, and each TPMI field separately indicates the precoding information and/or the number of layers conveyed over the SRS ports of the indicated SRS resource in each SRS resource set. In some examples, only a single TRI and TPMI is indicated, with the assumption that the codebook is based on a multi-panel transmission. The port to panel multiplexing can be predefined (e.g., port 1000/1002 for panel 1, and port 1001/1003 for panel 2), or configured by higher layer signaling. The total number of layers across panels should be no more than the maximum number of layers reported by the UE capability information and configured by base station. Separate indicator(s) or extensions of legacy field(s) for joint indication for both beams can be introduced to provide at least a portion of the above-noted information. For each panel, up to 1 PT-RS port can be enabled.

For scheme 4a and 4b, the UE can report a maximum number of layers for each panel to the base station (e.g., using a UE capability information message). In some examples, if the number of layers for each panel can be different, the UE can report the panel index to the base station during beam reporting to make the base station aware of the maximum number of layers for each beam. The base station can then use this information to configure a maximum number of layers for each panel using, for example, RRC signaling.

In some examples, for scheme 4a and 4b, the DMRS ports for each panel can be selected from different (or the same) Code Division Multiplexing (CDM) groups. In particular, the DMRS ports associated with two TPMI/SRI fields can be from the same or different CDM groups. For scheme 3 and 4, the UE can report the capability of antenna coherency (e.g., coherent transmission, partial coherent transmission, and non-coherent transmission) for each panel. The base station can then configure the codebook subset based on the UE capability for each panel.

Although aspects of the multi-panel PUSCH transmission techniques described herein are discussed in the context of PUSCH transmissions scheduled by DCI, aspects of the present disclosure can be applied to configured grant PUSCH by, for example, providing some or all of the above-noted indicators over RRC.

In accordance with an aspect of the present disclosure, a new or revised DCI format to support multi-panel PUSCH transmission can be provided. In some examples, the DCI format can be an existing DCI format, such as DCI format 0_1 and/or 0_2, that has been revised to include some or all of the fields described below. In some examples, a new DCI format can be defined, the size of which can be configured to align with other DCI formats (e.g., 2_x). A new radio network temporary identifier (RNTI) can be defined to scramble the DCI for multi-panel PUSCH transmission (e.g., a multimedia broadcast/multicast (MBMS) RNTI (MP-RNTI)). In some examples, the new or revised DCI format can include some or all of the following fields for multi-panel PUSCH transmission:

New data indicator (NDI) field: extend the NDI field from 1 bit to 2 bits in order to indicate the PUSCH scheduling of panel 1 or panel 2.

RV version: 4 bits to indicate RV version for panel 1 and panel 2, or 2 bits for both panels.

Multiplexing scheme indication: bits to indicate the multiplexing scheme (e.g., TDM, FDM, SDM, among others).

Frequency domain resource allocation (FDRA): bits to indicate the frequency domain resources for panel 1 and panel 2. In some examples, the field of FDRA for panel 2 is configurable.

HARQ Process ID (HPID): each panel can use the same or different HPID, which can be configurable.

MCS: each panel can use the same or different MCS, which can be configurable and can depend on the multiplexing scheme.

Transmission power command (TPC): TPC command for PUSCH on each panel.

In accordance with an aspect of the present disclosure, UE behavior for uplink power control and power headroom reporting in multi-panel PUSCH transmissions can be defined. In general, power headroom (PH) indicates the gap between the maximum transmission power and a transmission power that is used to facilitate uplink resource allocation and scheduling. In some examples, a wireless network (e.g., the wireless network 100) can support two types of power headroom report (PHR) (e.g., as described in 3GPP TS 38.213 section 7.7). For Type 1 PHR, the measurement is based on power control parameters for PUSCH transmission. For Type 3 PHR, the measurement is based on power control parameters for SRS transmission. For each type of PHR, a UE can report the PHR based on an actual transmission (actual PHR) or reference transmission (reference PHR). The actual PHR measured from PUSCH transmission occasion k is calculated as Pcmax(k)−Ptx(k), where Pcmax indicates the maximum transmission power and Ptx indicates the actual transmission power.

In some examples, power control is performed in a panel-specific manner (e.g., for schemes 3a, 3b, 4a, and 4b). The maximum transmission power for each panel can be reported to the base station using a UE capability message. Alternatively, the UE can report its maximum transmission power, and the maximum transmission power for each panel is determined (e.g., by the base station) based on, for example, an equal split of the maximum transmission power. In some examples, a UE may indicate a power class. The maximum transmission power for each panel maybe further configured by higher layers explicitly by the network.

In some examples, the power control parameters, including, for example, P0, alpha, pathloss reference signal and closed-loop power control process, for each panel can be derived by the power control parameters associated with the indicated TCI state. For DCI format 0_2, some power control parameters, such as P0 and alpha, can be selected by DCI field "Open-loop power control parameter set indication," which can provide the indication of power control parameter set selection for each panel. In some examples, the bit per resource element (BPRE) (e.g., as described in 3GPP TS 38.213 section 7.1.1) is derived based on the allocated resources for a PUSCH transmission by a corresponding panel/beam.

In some examples, the TPC indicated in DCI may be commonly applied to each TCI State. Additional TPC can be enabled by RRC signaling to provide the indication for the second closed-loop power control process for the second beam if different closed-loop power control processes are associated with different TCI States. Alternatively, a 1-bit field maybe added into a scheduling DCI to indicate the UL beam/panel index that the TPC command in the same scheduling DCI is applied. For example, the value of '0' can indicate the first UL beam/panel, and the value '1' can indicate the second beam/panel.

In some examples, power control is performed in a UE-specific manner (e.g., for schemes 3a, 3b, 4a, and 4b). For example, the power control parameters, other than pathloss reference signal, can be separately configured or derived based on those associated with the first or second TCI. The pathloss can be derived based on one pathloss reference signal associated with the first or second TCI, or both pathloss reference signals associated with both TCI states. For example, the pathloss can be derived based on the maximum, minimum, or average pathloss measured for both signals. In some examples, the BPRE can be derived based on the total allocated resources for PUSCH across panels/beams, or derived based on maximum, minimum, or average BPRE across panels/beams. Alternatively, the actual transmission power can be the maximum, minimum, or average transmission power across panels, as discussed above.

In some examples, whether the power control is performed in a panel-specific or UE-specific manner can be configured by RRC signaling based on UE capability. Note that different options may be selected for different multiplexing schemes.

As a further extension, with regard to inter-panel interference, two power control parameter sets can be provided by the base station based on higher layer signaling (e.g., RRC or MAC CE) in order to determine the transmission power for a panel. The first set can be used for power control with regard to target receiving power for the target receiving TRP. The second set can used for the power control with regard to the interference to the other receiving TRP. The final transmission power P_tx can be determined by the transmission power determined by each set (e.g., P_tx1 and P_tx2). In some examples, P_tx=min{P_tx1, P_tx2}, although other functions (e.g., maximum, average, etc.) can be used. The two power control parameter sets may include all or a subset of power control parameters (e.g., P0, alpha, closed-loop power control process index, and pathloss reference signal).

In accordance with an aspect of the present disclosure, actual PHR for multi-panel PUSCH transmissions can be reported. In some examples, a single actual PHR is reported. For example, if panel-specific power control is enabled, then the single actual PHR can be derived based on the Pcmax and Ptx for the first or second TCI. The TCI selection may be predefined, based on the first resource block index for the beam (e.g., scheme 3a or 3b), based on the first layer index for the beam (e.g., scheme 4a or 4b), indicated by base station, or reported by UE (e.g., in a PHR MAC CE). On the other hand, if UE-specific power control is enabled, then the single actual PHR can be derived based on the Pcmax and Ptx for the corresponding PUSCH transmission.

In some examples, multiple actual PHR are reported. For example, if panel-specific power control is enabled, then the UE can report the actual PHR for each panel/TCI based on the corresponding Pcmax and Ptx for the PUSCH transmission with the TCI.

In some examples, whether the UE reports a single or multiple actual PHR can be configured by RRC signaling based on UE capability. In some examples, whether the UE reports single or multiple actual PHR can be determined by whether trigger conditions for both PHRs are met or not. The trigger condition can include, for example, the trigger conditions defined in section 5.4.6 of 3GPP TS 38.321, the entire content of which is incorporated herein by reference. In some examples, this trigger condition can be extended to be panel/beam specific with panel/beam specific parameters including at least one of phr-PeriodicTimer, phr-Prohibit-Timer, phr-Tx-PowerFactorChange, mpe-Reporting, mpe-ProhibitTimer, and mpe-Threshold.

In some examples, the PHR type for each panel can be configured separately. For example, an actual PHR can be configured for a first panel, and virtual PHR can be configured for the second panel in order to minimize the reporting overhead. This is feasible because the scheduling information (e.g., RBs) for the second panel is known at the network side, and virtual PHR is sufficient to know the path loss and accumulated power.

In some examples, section 5.4.6 of 3GPP TS 38.321 can be amended to include the following to incorporate particular aspects of the present disclosure:

A Power Headroom Report (PHR) for a panel shall be triggered if any of the following events occur:

phr-ProhibitTimer for the panel expires or has expired and the path loss for the panel has changed more than phr-Tx-PowerFactorChange dB for at least one activated Serving Cell of any MAC entity of which the active DL BWP is not dormant BWP which is used as a pathloss reference since the last transmission of a PHR in this MAC entity when the MAC entity has UL resources for new transmission;

phr-PeriodicTimer for the panel expires;

upon configuration or reconfiguration of the power headroom reporting functionality by upper layers, which is not used to disable the function;

activation of an SCell of any MAC entity with configured uplink of which firstActiveDownlinkBWP-Id is not set to dormant BWP;

addition of the PSCell (i.e. PSCell is newly added or changed);

phr-ProhibitTimer for the panel expires or has expired, when the MAC entity has UL resources for new transmission, and the following is true for any of the activated Serving Cells of any MAC entity with configured uplink:

there are UL resources allocated for transmission or there is a PUCCH transmission on this cell, and the required power backoff due to power management (as allowed by P-MPRc as specified in TS 38.101-1 [14], TS 38.101-2 [15], and TS 38.101-3 [16]) for this panel has changed more than phr-Tx-PowerFactorChange dB since the last transmission of a PHR when the MAC entity had UL resources allocated for transmission or PUCCH transmission on this cell.

Upon switching of activated BWP from dormant BWP to non-dormant DL BWP of an SCell of any MAC entity with configured uplink;

if mpe-Reporting is configured, mpe-ProhibitTimer for the panel is not running, and the measured P-MPR applied to meet MPE requirements as specified in TS 38.101-2 [15] is more than or equal to mpe-Threshold for the panel for at least one activated Serving Cell since the last transmission of a PHR in this MAC entity.

NOTE 2: The MAC entity should avoid triggering a PHR when the required power backoff due to power management decreases only temporarily (e.g. for up to a few tens of milliseconds) and it should avoid reflecting such temporary decrease in the values of PCMAX,f,c/PH when a PHR is triggered by other triggering conditions.

NOTE 3: If a HARQ process is configured with cg-RetransmissionTimer and if the PHR is already included in a MAC PDU for transmission by this HARQ process, but not yet transmitted by lower layers, it is up to UE implementation how to handle the PHR content.

FIG. 5 illustrates a flowchart of an example process 500 for single-DCI-based multi-panel PUSCH transmission, in accordance with some embodiments. For clarity of presentation, the description that follows generally describes process 500 in the context of the other figures in this description. For example, process 500 can be performed by the UE 102 of FIG. 1. It will be understood that process 500 can be performed, for example, by any suitable system, environment, software, hardware, or a combination of systems, environments, software, and hardware, as appropriate. In some implementations, various steps of process 500 can be run in parallel, in combination, in loops, or in any order.

Operations of the process 500 include receiving 502 DCI scheduling a first PUSCH transmission to be transmitted by a first antenna panel of the UE, and a second PUSCH transmission to be transmitted by a second antenna panel of the UE. For example, the receive circuitry 114 of the UE 102 can receive the DCI and forward it to the control circuitry 110 for decoding and subsequent processing. As described herein, a single DCI can be used to schedule both the first PUSCH transmission to be transmitted by the first antenna panel and the second PUSCH transmission to be transmitted by the second antenna panel.

The UE also receives 504 data indicative of at least two TCI states. For example, the UE can receive a first TCI state indicating a beam of the first antenna panel (e.g., a beam of an antenna panel included in the transmit circuitry 112) for transmission of the first PUSCH transmission. The UE can also receive a second TCI state indicating a beam of the second antenna panel (e.g., a beam of another antenna panel included in the transmit circuitry 112) for transmission of the second PUSCH transmission. In some examples, the at least two TCI states are unified TCI states (e.g., as specified in Release 17 of the 3GPP 5G NR standard). In some examples, one or more of the TCI states are received by a MAC TCI state command or other higher layer signaling.

Based on the received DCI and TCI states, the UE transmits 506 the first PUSCH transmission using the indicated beam of the first antenna panel, and transmits the second PUSCH transmission using the indicated beam of the second antenna panel. For example, the UE can transmit the first PUSCH transmission using the beam of the first antenna panel to a first TRP, and can transmit the second PUSCH transmission using the beam of the second antenna panel to a second TRP that is different from the first TRP.

In some examples, the UE can receive an indication of a multiplexing scheme for transmission of the first and second PUSCH transmissions. Such an indication can be included in the scheduling DCI, or received by RRC, MAC-CE, or other higher layer signaling. The UE can then transmit the first and second PUSCH transmissions according to the multiplexing scheme. In some examples, the multiplexing scheme can include one of an FDM repetition scheme, an FDM beam hopping scheme, an SDM repetition scheme, an SDM multiplexing scheme, a TDM scheme, or a single TRP scheme, among others. In some examples, such as where the multiplexing scheme is an FDM or SDM repetition scheme, the UE can determine a TBS for the first and second PUSCH transmissions based at least in part on a number of subcarriers used for at least one of the first PUSCH transmission of the second PUSCH transmission.

In some examples, the UE can determine one of more power control parameters (e.g., P0, alpha, closed-loop power control process index, and pathloss reference signal, among others) based on the indicated TCI state(s). For example, the UE can determine one or more first power control parameter based on the first TCI state, and one or more second power control parameters based on the second TCI state. The UE can then transmit the first PUSCH transmission using the beam of the first antenna panel in accordance with the one or more first power control parameters, and can transmit the second PUSCH transmission using the beam of the second antenna panel in accordance with the one or more second power control parameters.

In some examples, the UE can determine an actual transmission power for the first PUSCH transmission, the second PUSCH transmission, or both. The UE can then determine a power headroom based on a difference between a maximum transmission power of the UE and the determined actual transmission power. In some examples, the maximum transmission power is a panel-specific maximum transmission power, and the power headroom is determined based on a difference between the panel-specific maximum transmission power and the determined actual transmission power. In some examples, the maximum transmission power is a UE-specific maximum transmission power, and the power headroom is determined based on a difference between the UE-specific maximum transmission power and the determined actual transmission power.

FIG. 6 illustrates a flowchart of an example process 600 for single-DCI-based multi-panel PUSCH transmission, in accordance with some embodiments. For clarity of presentation, the description that follows generally describes process 600 in the context of the other figures in this description. For example, process 600 can be performed by the base station 104 of FIG. 1 or another TRP. It will be understood that process 600 can be performed, for example, by any suitable system, environment, software, hardware, or a combination of systems, environments, software, and hardware, as appropriate. In some implementations, various steps of process 600 can be run in parallel, in combination, in loops, or in any order.

Operations of the process 600 include transmitting 602 DCI to a UE. For example, the base station 104 can generate (e.g., using the control circuitry 116) and transmit (e.g., using the transmit circuitry 118) the DCI to the UE 102. The DCI can include information scheduling both a first PUSCH transmission to be transmitted by a first antenna panel of the UE, and a second PUSCH transmission to be transmitted by a second antenna panel of the UE.

The base station also transmits 604 data indicative of at least two TCI states to the UE. For example, the base station can transmit a first TCI state to the UE indicating a beam of the first antenna panel for transmission of the first PUSCH transmission. The base station can also transmit a second TCI state to the UE indicating a beam of the second antenna panel for transmission of the second PUSCH transmission. In some examples, the at least two TCI states are unified TCI states (e.g., as specified in Release 17 of the 3GPP 5G NR standard). In some examples, one or more of the TCI states are transmitted by a MAC TCI state command or other higher layer signaling.

The base station (or a TRP of the base station) receives 606 at least one of the first PUSCH transmission transmitted by the UE using the indicated beam of the first antenna panel, or the second PUSCH transmission transmitted by the UE using the indicated beam of the second antenna panel. For example, the receive circuitry 120 of the base station 104 can receive the first and/or second PUSCH transmission and forward it to the control circuitry 116 for decoding and processing (e.g., of RRC, UCI, and/or other data communicated from the UE).

In some examples, the base station can transmit, to the UE, an indication of a multiplexing scheme for transmission of the first and second PUSCH transmissions. Such an indication can be included in the scheduling DCI, or by a separate RRC, MAC-CE, or other higher layer signaling transmission. In some examples, the multiplexing scheme can include one of an FDM repetition scheme, an FDM beam hopping scheme, an SDM repetition scheme, an SDM multiplexing scheme, a TDM scheme, or a single TRP scheme, among others. In some examples, such as where the multiplexing scheme is an FDM or SDM repetition scheme, the base station can transmit data indicative of an RV for each of the beam of the first and second antenna panels, or data indicative of an RV for the beam of the first antenna panel and a RV offset for the beam of the second antenna panel. In some examples, such as where the multiplexing scheme is an SDM repetition scheme or an SDM multiplexing scheme, the base station can receive data indicative of a maximum number of layers for each of the first and second antenna panels, and can transmit an indication of a number of layers for transmission of the first and second PUSCH transmissions.

In some examples, the base station can receive data indicative of a maximum transmission power for each of the first and second antenna panels of the UE. Based on this information, the base station can include, in the DCI, a TPC for the first and second PUSCH transmissions.

Figure 7:
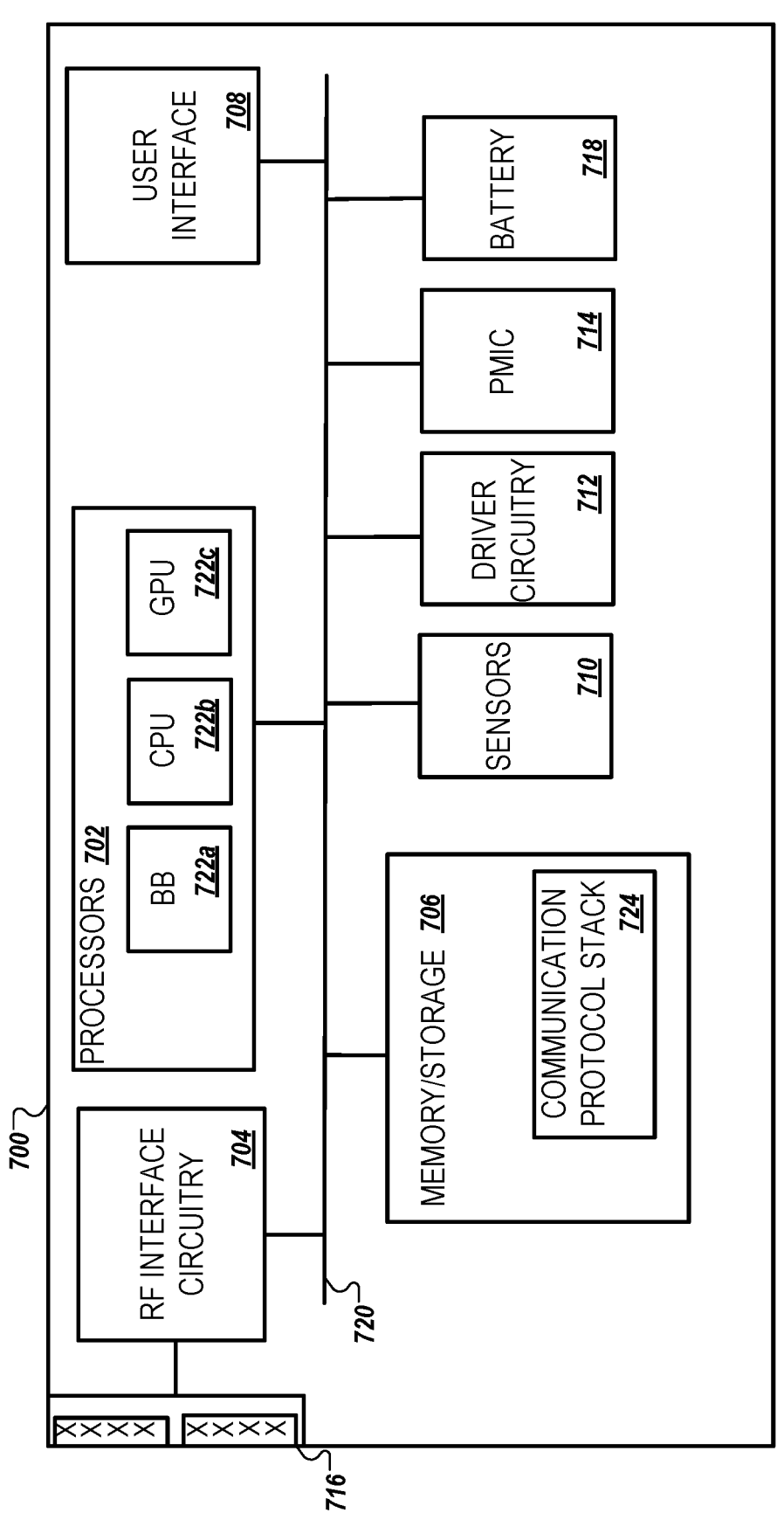
FIG. 7 illustrates a user equipment (UE), in accordance with some embodiments.

FIG. 7 illustrates a UE 700, in accordance with some embodiments. The UE 700 may be similar to and substantially interchangeable with UE 102 of FIG. 1.

The UE 700 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices.

The UE 700 may include processors 702, RF interface circuitry 704, memory/storage 706, user interface 708, sensors 710, driver circuitry 712, power management integrated circuit (PMIC) 714, antenna structure 716, and battery 718. The components of the UE 700 may be implemented as integrated circuits (ICs), portions thereof, discrete electronic devices, or other modules, logic, hardware, software, firmware, or a combination thereof. The block diagram of FIG. 7 is intended to show a high-level view of some of the components of the UE 700. However, some of the components shown may be omitted, additional components may be present, and different arrangement of the components shown may occur in other implementations.

The components of the UE 700 may be coupled with various other components over one or more interconnects 720, which may represent any type of interface, input/output, bus (local, system, or expansion), transmission line, trace, optical connection, etc. that allows various circuit components (on common or different chips or chipsets) to interact with one another.

The processors 702 may include processor circuitry such as, for example, baseband processor circuitry (BB) 722A, central processor unit circuitry (CPU) 722B, and graphics processor unit circuitry (GPU) 722C. The processors 702 may include any type of circuitry or processor circuitry that executes or otherwise operates computer-executable instructions, such as program code, software modules, or functional processes from memory/storage 706 to cause the UE 700 to perform operations as described herein.

In some embodiments, the baseband processor circuitry 722A may access a communication protocol stack 724 in the memory/storage 706 to communicate over a 3GPP compatible network. In general, the baseband processor circuitry 722A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 704. The baseband processor circuitry 722A may generate or process baseband signals or waveforms that carry information in 3GPP-compatible networks. In some embodiments, the waveforms for NR may be based cyclic prefix OFDM "CP-OFDM" in the uplink or downlink, and discrete Fourier transform spread OFDM "DFT-S-OFDM" in the uplink.

The memory/storage 706 may include one or more non-transitory, computer-readable media that includes instructions (for example, communication protocol stack 724) that may be executed by one or more of the processors 702 to cause the UE 700 to perform various operations described herein. The memory/storage 706 include any type of volatile or non-volatile memory that may be distributed throughout the UE 700. In some embodiments, some of the memory/storage 706 may be located on the processors 702 themselves (for example, L1 and L2 cache), while other memory/storage 706 is external to the processors 702 but accessible thereto via a memory interface. The memory/storage 706 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 704 may include transceiver circuitry and radio frequency front module (RFEM) that allows the UE 700 to communicate with other devices over a radio access network. The RF interface circuitry 704 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 716 and proceed to filter and amplify (with a low-noise amplifier) the signal. The signal may be provided to a receiver of the transceiver that downconverts the RF signal into a baseband signal that is provided to the baseband processor of the processors 702.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 716.

In various embodiments, the RF interface circuitry 704 may be configured to transmit/receive signals in a manner compatible with NR access technologies.

The antenna 716 may include antenna elements to convert electrical signals into radio waves to travel through the air and to convert received radio waves into electrical signals. The antenna elements may be arranged into one or more antenna panels. The antenna 716 may have antenna panels that are omnidirectional, directional, or a combination thereof to enable beamforming and multiple input, multiple output communications. The antenna 716 may include microstrip antennas, printed antennas fabricated on the surface of one or more printed circuit boards, patch antennas, phased array antennas, etc. The antenna 716 may have one or more panels designed for specific frequency bands including bands in FR1 or FR2.

The user interface 708 includes various input/output (I/O) devices designed to enable user interaction with the UE 700. The user interface 708 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs), or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 700.

The sensors 710 may include devices, modules, or subsystems whose purpose is to detect events or changes in its environment and send the information (sensor data) about the detected events to some other device, module, subsystem, etc. Examples of such sensors include, inter alia, inertia measurement units including accelerometers, gyroscopes, or magnetometers; microelectromechanical systems or nano-electromechanical systems including 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 712 may include software and hardware elements that operate to control particular devices that are embedded in the UE 700, attached to the UE 700, or otherwise communicatively coupled with the UE 700. The driver circuitry 712 may include individual drivers allowing other components to interact with or control various input/output (I/O) devices that may be present within, or connected to, the UE 700. For example, driver circuitry 712 may include a display driver to control and allow access to a display device, a touchscreen driver to control and allow access to a touchscreen interface, sensor drivers to obtain sensor readings of sensor circuitry 728 and control and allow access to sensor circuitry 728, drivers to obtain actuator positions of electro-mechanic components or control and allow access to the electro-mechanic components, a camera driver to control and allow access to an embedded image capture device, audio drivers to control and allow access to one or more audio devices.

The PMIC 714 may manage power provided to various components of the UE 700. In particular, with respect to the processors 702, the PMIC 714 may control power-source selection, voltage scaling, battery charging, or DC-to-DC conversion.

In some embodiments, the PMIC 714 may control, or otherwise be part of, various power saving mechanisms of the UE 700 including DRX as discussed herein. A battery 718 may power the UE 700, although in some examples the UE 700 may be mounted deployed in a fixed location, and may have a power supply coupled to an electrical grid. The battery 718 may be a lithium ion battery, a metal-air battery, such as a zinc-air battery, an aluminum-air battery, a lithium-air battery, and the like. In some implementations, such as in vehicle-based applications, the battery 718 may be a typical lead-acid automotive battery.

Figure 8:
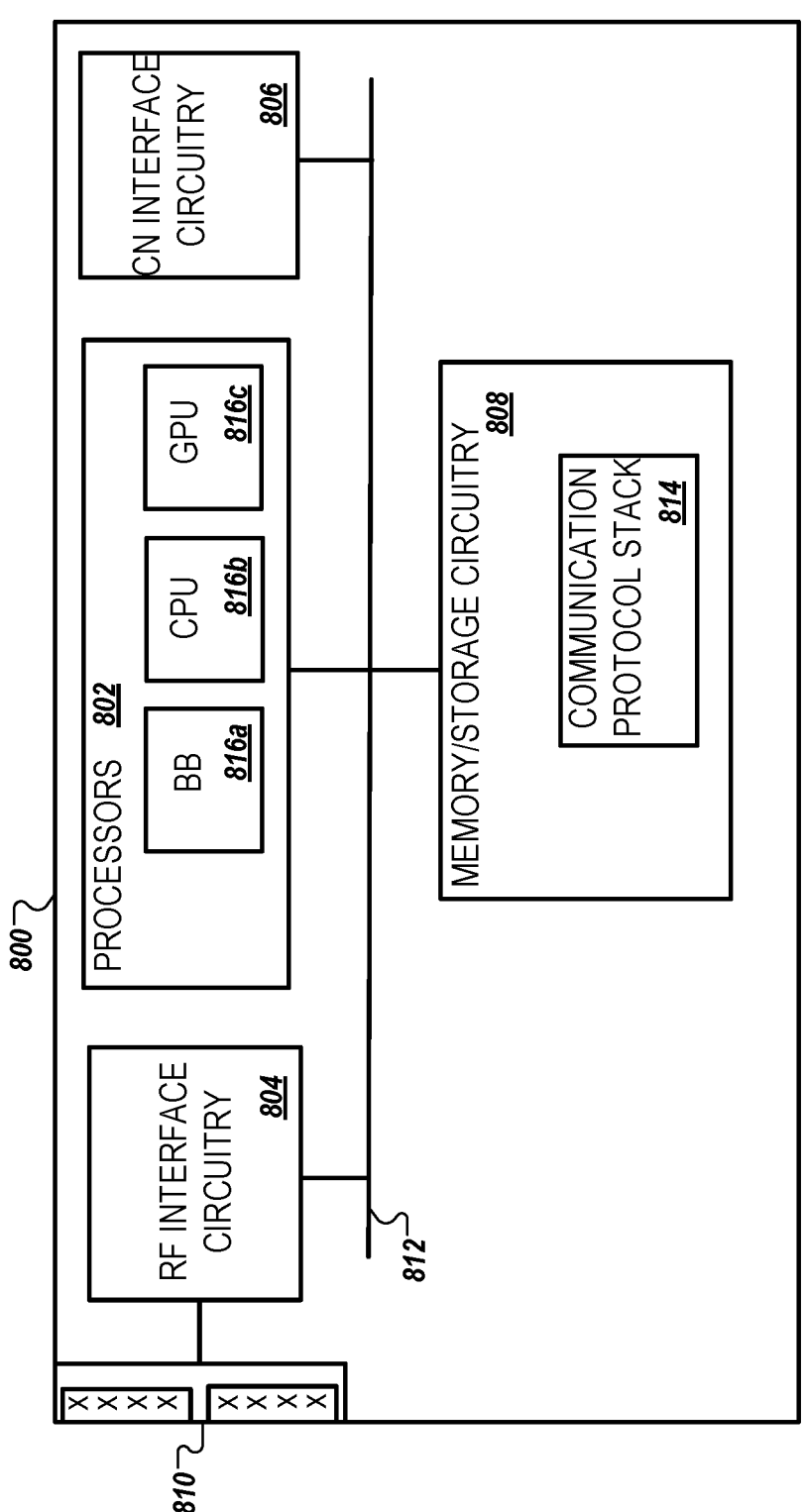
FIG. 8 illustrates an access node, in accordance with some embodiments.

FIG. 8 illustrates an access node 800 (e.g., a base station or gNB), in accordance with some embodiments. The access node 800 may be similar to and substantially interchangeable with base station 104. The access node 800 may include processors 802, RF interface circuitry 804, core network (CN) interface circuitry 806, memory/storage circuitry 808, and antenna structure 810.

The components of the access node 800 may be coupled with various other components over one or more interconnects 812. The processors 802, RF interface circuitry 804, memory/storage circuitry 808 (including communication protocol stack 814), antenna structure 810, and interconnects 812 may be similar to like-named elements shown and described with respect to FIG. 7. For example, the processors 802 may include processor circuitry such as, for example, baseband processor circuitry (BB) 816A, central processor unit circuitry (CPU) 816B, and graphics processor unit circuitry (GPU) 816C.

The CN interface circuitry 806 may provide connectivity to a core network, for example, a 5th Generation Core network (5GC) using a 5GC-compatible network interface protocol such as carrier Ethernet protocols, or some other suitable protocol. Network connectivity may be provided to/from the access node 800 via a fiber optic or wireless backhaul. The CN interface circuitry 806 may include one or more dedicated processors or FPGAs to communicate using one or more of the aforementioned protocols. In some implementations, the CN interface circuitry 806 may include multiple controllers to provide connectivity to other networks using the same or different protocols.

As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can include ground stations (e.g., terrestrial access points) or satellite stations providing coverage within a geographic area (e.g., a cell). As used herein, the term "NG RAN node" or the like may refer to an access node 800 that operates in an NR or 5G system (for example, a gNB), and the term "E-UTRAN node" or the like may refer to an access node 800 that operates in an LTE or 4G system (e.g., an eNB). According to various embodiments, the access node 800 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the access node 800 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by the access node 800; a MAC/PHY split wherein RRC, PDCP, RLC, and MAC layers are operated by the CRAN/vBBUP and the PHY layer is operated by the access node 800; or a "lower PHY" split wherein RRC, PDCP, RLC, MAC layers and upper portions of the PHY layer are operated by the CRAN/vBBUP and lower portions of the PHY layer are operated by the access node 800.

In V2X scenarios, the access node 800 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

EXAMPLES

In the following section, further exemplary embodiments are provided.

Example 1 is a method that includes receiving downlink control information (DCI) scheduling a first physical uplink shared channel (PUSCH) transmission to be transmitted by a first antenna panel of the UE, and a second PUSCH transmission to be transmitted by a second antenna panel of the UE, receiving data indicative of at least two transmission configuration indicator (TCI) states, the at least two TCI states including a first TCI state indicating a beam of the first antenna panel for transmission of the first PUSCH transmission, and a second TCI state indicating a beam of the second antenna panel for transmission of the second PUSCH transmission, and transmitting the first PUSCH transmission using the beam of the first antenna panel and the second PUSCH transmission using the beam of the second antenna panel.

Example 2 is the method of Example 1, where transmitting the first and second PUSCH transmissions includes: transmitting the first PUSCH transmission using the beam of the first antenna panel to a first transmission/reception point (TRP), and transmitting the second PUSCH transmission using the beam of the second antenna panel to a second TRP that is different from the first TRP.

Example 3 is the method of Example 1 or 2, where an indication of a multiplexing scheme for transmission of the first and second PUSCH transmissions is received, and transmitting the first and second PUSCH transmissions includes transmitting the first and second PUSCH transmissions according to the multiplexing scheme.

Example 4 is the method of Example 3, where the indication of the multiplexing scheme is received by the DCI, by radio resource control (RRC) signaling, or by a medium access control (MAC) control element (CE).

Example 5 is the method of Example 3, where the multiplexing scheme includes a frequency domain multiplexing (FDM) repetition scheme, a FDM beam hopping scheme, a spatial domain multiplexing (SDM) repetition scheme, or a SDM multiplexing scheme.

Example 6 is the method of Example 3, where the multiplexing scheme is an FDM repetition scheme or an SDM repetition scheme, and a transport block size (TBS) for the first and second PUSCH transmissions is determined based at least in part on a number of subcarriers used for at least one of the first PUSCH transmission or the second PUSCH transmission.

Example 7 is the method of any of the preceding Examples, where the at least two TCI states are unified TCI states.

Example 8 is the method of any of the preceding Examples, where one or more first power control parameters are determined based on the first TCI state, one or more second power control parameters are determined based on the second TCI state, and the first PUSCH transmission is transmitted using the beam of the first antenna panel in accordance with the one or more first power control parameters, and the second PUSCH transmission is transmitted using the beam of the second antenna panel in accordance with the one or more second power control parameters.

Example 9 is the method of any of the preceding Examples, where an actual transmission power for at least one of the first PUSCH transmission and the second PUSCH transmission is determined, and a power headroom is determined based on a difference between a maximum transmission power for the UE and the actual transmission power.

Example 10 is the method of Example 9, where the maximum transmission power is a panel-specific maximum transmission power, and the power headroom is determined based on a difference between the panel-specific maximum transmission power and the actual transmission power for one of the first or second PUSCH transmissions.

Example 11 is the method of Example 10, where the maximum transmission power is a UE-specific maximum transmission power, and the power headroom is determined based on a difference between the UE-specific maximum transmission power and the actual transmission power of both the first and second PUSCH transmissions.

Example 12 is the method of any of the preceding Examples, where an indication of a first number of layers for transmission of the first PUSCH transmission and a second number of layers for transmission of the second PUSCH transmission is received, where the first number of layers if equal to the second number of layers.

Example 13 is the method of any of the preceding Examples, where at least one of a number of layers, a modulation and coding scheme (MCS), a redundancy value (RV), a hybrid automatic repeat request (HARD) process, a new data indicator, or a phase tracking reference signal (PTRS) to demodulation reference signal (DMRS) association for the beam of the first antenna panel and the beam of the second antenna panel are different.

Example 14 is the method of any of the preceding Examples, where an indication of a transmission rank indicator (TRI) and a transmission precoder matrix index (TPMI) are received, where the TRI and the TPMI are jointly coded.

Example 15 is the method of any of the preceding Examples, where a demodulation reference signal (DMRS) port for each of the first and second antenna panels is different.

Example 16 is a method that includes transmitting DCI to a UE, the DCI scheduling a first PUSCH transmission to be transmitted by a first antenna panel of the UE, and a second PUSCH transmission to be transmitted by a second antenna panel of the UE, transmitting data indicative of at least two TCI states to the UE, the at least two TCI states including a first TCI state indicating a beam of the first antenna panel for transmission of the first PUSCH transmission, and a second TCI state indicating a beam of the second antenna panel for transmission of the second PUSCH transmission, receiving at least one of the first PUSCH transmission transmitted using the beam of the first antenna panel or the second PUSCH transmission transmitted using the beam of the second antenna panel.

Example 17 is the method of Example 16, where an indication of a multiplexing scheme for transmission of the first and second PUSCH transmissions is transmitted to the UE.

Example 18 is the method of Example 17, where the indication of the multiplexing scheme is transmitted in the DCI, by RRC signaling, or by a MAC-CE.

Example 19 is the method of Example 17, where the multiplexing scheme is an FDM repetition scheme, an FDM beam hopping scheme, an SDM repetition scheme, or an SDM multiplexing scheme.

Example 20 is the method of Example 17, where the multiplexing scheme is an FDM repetition scheme or an SDM repetition scheme, and data indicative of a redundancy value (RV) for each of the beam of the first antenna panel and the beam of the second panel is transmitted to the UE, or data indicative of an RV for the beam of the first antenna panel and an RV offset for the beam of the second antenna panel is transmitted to the UE.

Example 21 is the method of Example 17, where the multiplexing scheme is an SDM repetition scheme or an SDM multiplexing scheme, and data indicative of a maximum number of layers for each of the first antenna panel and the second antenna panel is received, and an indication of a number of layers for transmission of the first PUSCH transmission and the second PUSCH transmission is transmitted to the UE.

Example 22 is the method of any of Examples 16-21, where the at least two TCI states are unified TCI states.

Example 23 is the method of any of Examples 16-22, where data indicative of a maximum transmission power for each of the first antenna panel and the second antenna panel is received, and the DCI includes a transmission power command (TPC) for the first PUSCH transmission to be transmitted by the first antenna panel of the UE and the second PUSCH transmission to be transmitted by the second antenna panel of the UE, in which the TPC is determined based at least in part on the maximum transmission power for each of the first antenna panel and the second antenna panel.

Example 24 is the method of any of Examples 16-23, where an indication of a first number of layers for transmission of the first PUSCH transmission and a second number of layers for transmission of the second PUSCH transmission is transmitted to the UE, where the first number of layers if equal to the second number of layers.

Example 25 is the method of any of Examples 16-24, where at least one of a number of layers, a MCS, a RV, a HARQ process, a new data indicator, or a PTRS to DMRS association for the beam of the first antenna panel and the beam of the second antenna panel are different.

Example 26 is the method of any of Examples 16-25, where an indication of a TRI and a TPMI are transmitted to the UE, where the TRI and the TPMI are jointly coded.

Example 27 is the method of any of Examples 16 to 26, where a DMRS port for each of the first and second antenna panels is different.

Example 28 includes one or more non-transitory computer-readable media storing instructions to cause an electronic device, upon execution of the instructions by one or more processors of the electronic device, to perform one or more elements of a method described in or related to any of examples 1-27, or any other method or process described herein.

Example 29 includes an apparatus having logic, modules, or circuitry to perform one or more elements of a method described in or related to any of examples 1-27, or any other method or process described herein.

Example 30 includes a method, technique, or process as described in or related to any of examples 1-27, or portions or parts thereof.

Example 31 includes an apparatus having: one or more processors and one or more computer-readable media comprising instructions that, when executed by the one or more processors, cause the one or more processors to perform the method, techniques, or process as described in or related to any of examples 1-27, or portions or parts thereof.

Example 32 includes a signal as described in or related to any of examples 1-27, or portions or parts thereof.

Example 33 includes an information element, packet, frame, segment, PDU, or message as described in or related to any of examples 1-27, or portions or parts thereof, or otherwise described in the present disclosure.

Example 34 includes a signal encoded with data as described in or related to any of examples 1-27, or portions or parts thereof, or otherwise described in the present disclosure.

Example 35 includes a signal encoded with an IE, packet, frame, segment, PDU, or message as described in or related to any of examples 1-27, or portions or parts thereof, or otherwise described in the present disclosure.

Example 36 includes an electromagnetic signal carrying computer-readable instructions, where execution of the computer-readable instructions by one or more processors is to cause the one or more processors to perform the method, techniques, or process as described in or related to any of examples 1-27, or portions or parts thereof.

Example 37 includes a computer program comprising instructions, where execution of the program by a processing element is to cause the processing element to carry out the method, techniques, or process as described in or related to any of examples 1-27, or portions or parts thereof.

Example 38 includes a method of communicating in a wireless network as shown and described herein.

Example 39 includes a system for providing wireless communication as shown and described herein.

Example 30 includes a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

We claim:

1. An apparatus comprising one or more baseband processors configured to perform operations comprising:

receiving downlink control information (DCI) scheduling at least one physical uplink shared channel (PUSCH) transmission to be transmitted by a first antenna panel of a user equipment (UE) and a second antenna panel of the UE, wherein the DCI comprises a sounding reference signal (SRS) resource set indicator field, and wherein a value of the SRS resource set indicator field indicates an association of transmission configuration indicator (TCI) states with the first and second antenna panels for the at least one PUSCH transmission;

receiving data indicative of at least two TCI states, the at least two TCI states including a first TCI state indicating a beam of the first antenna panel for transmission of the at least one PUSCH transmission, and a second TCI state indicating a beam of the second antenna panel for transmission of the at least one PUSCH transmission; and transmitting, in accordance with the association indicated by the SRS resource set indicator field, the at least one PUSCH transmission using the beam of the first antenna panel and the beam of the second antenna panel.

2. The apparatus of claim 1, wherein transmitting the at least one PUSCH transmission comprises:

transmitting the at least one PUSCH transmission using the beam of the first antenna panel to a first transmission/reception point (TRP); and transmitting the at least one PUSCH transmission using the beam of the second antenna panel to a second TRP that is different from the first TRP.

3. The apparatus of claim 1, wherein the at least one PUSCH transmission is transmitted according to a multiplexing scheme, and wherein the multiplexing scheme comprises a frequency domain multiplexing (FDM) repetition scheme, a FDM beam hopping scheme, a spatial domain multiplexing (SDM) repetition scheme, or a SDM multiplexing scheme.

4. The apparatus of claim 1, wherein the at least one PUSCH transmission is transmitted according to a frequency domain multiplexing (FDM) repetition scheme or a spatial domain multiplexing (SDM) repetition scheme, and wherein the one or more baseband processors are configured to perform the operations comprising:

determining a transport block size (TBS) for the at least one PUSCH transmission based at least in part on a number of subcarriers used for the at least one PUSCH transmission.

5. The apparatus of claim 1, wherein the one or more baseband processors are configured to perform the operations comprising:

receiving an indication of a first number of layers for transmission of the at least one PUSCH transmission using the first antenna panel and a second number of layers for transmission of the at least one PUSCH transmission using the second panel, wherein the first number of layers is equal to the second number of layers.

6. The apparatus of claim 1, wherein the beam of the first panel comprises one or more characteristics that differ from those of beam of the second antenna panel, the one or more characteristics comprising at least one of: a number of layers, a modulation and coding scheme (MCS), a redundancy value (RV), a hybrid automatic repeat request (HARQ) process, a new data indicator, or a phase tracking reference signal (PTRS) to demodulation reference signal (DMRS) association.

7. The apparatus of claim 1, wherein the one or more baseband processors are configured to perform the operations comprising:

receiving an indication of a transmission rank indicator (TRI) and a transmission precoder matrix index (TPMI), wherein the TRI and the TPMI are jointly coded.

8. The apparatus of claim 1, wherein a demodulation reference signal (DMRS) port for each of the first antenna panel and the second antenna panel is different.

9. A method to be performed by a user equipment (UE), the method comprising:

receiving downlink control information (DCI) scheduling at least one physical uplink shared channel (PUSCH) transmission to be transmitted by a first antenna panel of the UE and a second antenna panel of the UE, wherein the DCI comprises a sounding reference signal (SRS) resource set indicator field, and wherein a value of the SRS resource set indicator field indicates an association of transmission configuration indicator (TCI) states with the first and second antenna panels for the at least one PUSCH transmission;

receiving data indicative of at least two TCI states, the at least two TCI states including a first TCI state indicating a beam of the first antenna panel for transmission of the at least one PUSCH transmission, and a second TCI state indicating a beam of the second antenna panel for transmission of the at least one PUSCH transmission; and transmitting, in accordance with the association indicated by the SRS resource set indicator field, the at least one PUSCH transmission using the beam of the first antenna panel and the beam of the second antenna panel.

10. A base station comprising one or more processors configured to perform operations comprising:

transmitting downlink control information (DCI) to a user equipment (UE), the DCI scheduling at least one physical uplink shared channel (PUSCH) transmission to be transmitted by a first antenna panel of the UE and a second antenna panel of the UE, wherein the DCI comprises a sounding reference signal (SRS) resource set indicator field, and wherein a value of the SRS resource set indicator field indicates an association of transmission configuration indicator (TCI) states with the first and second antenna panels for the at least one PUSCH transmission;

transmitting data indicative of at least two TCI states to the UE, the at least two TCI states including a first TCI state indicating a beam of the first antenna panel for transmission of the at least one PUSCH transmission, and a second TCI state indicating a beam of the second antenna panel for transmission of the at least one PUSCH transmission; and receiving the at least one PUSCH transmission transmitted using at least one of the beam of the first antenna panel or the beam of the second antenna panel.

11. The base station of claim 10, wherein the at least one PUSCH transmission is transmitted according to a frequency domain multiplexing (FDM) repetition scheme or a spatial domain multiplexing (SDM) repetition scheme, and wherein the one or more processors configured to perform the operations comprising transmitting, to the UE:

data indicative of a redundancy value (RV) for each of the beam of the first antenna panel and the beam of the second antenna panel; or data indicative of a RV for the beam of the first antenna panel and a RV offset for the beam of the second antenna panel.

12. The base station of claim 10, wherein the at least one PUSCH transmission is transmitted according to a spatial domain multiplexing (SDM) repetition scheme or a SDM multiplexing scheme, and wherein the one or more processors configured to perform the operations comprising:

receiving data indicative of a maximum number of layers for each of the first antenna panel and the second antenna panel; and transmitting an indication of a number of layers for transmission of the at least one PUSCH transmission.

13. The base station of claim 10, wherein the one or more processors configured to perform the operations comprising:

transmitting, to the UE, an indication of a first number of layers for transmission of the at least one PUSCH transmission using the first panel and a second number of layers for transmission of the at least one PUSCH transmission using the second panel, wherein the first number of layers is equal to the second number of layers.

14. The base station of claim 10, the beam of the first panel comprises one or more characteristics that differ from those of beam of the second antenna panel, the one or more characteristics comprising at least one of: a number of layers, a modulation and coding scheme (MCS), a redundancy value (RV), a hybrid automatic repeat request (HARQ) process, a new data indicator, or a phase tracking reference signal (PTRS) to demodulation reference signal (DMRS) association.

15. The base station of claim 10, wherein the one or more processors configured to perform the operations comprising:

transmitting, to the UE, an indication of a transmission rank indicator (TRI) and a transmission precoder matrix index (TPMI), wherein the TRI and the TPMI are jointly coded.

16. The base station of claim 10, wherein a demodulation reference signal (DMRS) port for each of the first antenna panel and the second antenna panel is different.

* * * * *